United States Patent [19]

Koslow

[11] Patent Number: 5,147,722
[45] Date of Patent: Sep. 15, 1992

[54] PROCESS FOR THE PRODUCTION OF MATERIALS AND MATERIALS PRODUCED BY THE PROCESS

[75] Inventor: Evan E. Koslow, Westport, Conn.

[73] Assignee: Koslow Technologies Corporation, Bridgeport, Conn.

[21] Appl. No.: 571,075

[22] Filed: Jan. 25, 1990

Related U.S. Application Data

[60] Division of Ser. No. 455,997, Dec. 22, 1989, Pat. No. 5,019,311, which is a continuation-in-part of Ser. No. 314,651, Feb. 23, 1989, abandoned.

[51] Int. Cl.⁵ ............... B32B 15/02; B32B 17/04; B32B 19/02
[52] U.S. Cl. .............................. 428/402; 264/122; 428/403; 428/404; 428/406; 428/407
[58] Field of Search ............... 264/122; 428/313.3, 428/313.5, 402, 403, 404, 406, 407

[56] References Cited

U.S. PATENT DOCUMENTS

| | | | |
|---|---|---|---|
| 2,865,800 | 12/1958 | Stastny | 428/313.5 |
| 3,325,341 | 6/1967 | Shannon | 428/406 |
| 3,375,933 | 4/1968 | Rodman | 210/502 |
| 3,608,010 | 9/1971 | Stayner | 521/135 |
| 3,726,755 | 4/1973 | Shannon | 428/313.5 |
| 3,796,778 | 3/1974 | Gallacher | 264/49 |
| 3,864,124 | 2/1975 | Breton et al. | 75/124 |
| 3,919,369 | 11/1975 | Holden | 264/45.1 |
| 3,986,851 | 10/1976 | Grode | 55/488 |
| 4,061,807 | 12/1977 | Shaler et al. | 428/71 |
| 4,180,211 | 12/1979 | Olcott | 428/313.3 |
| 4,194,040 | 5/1980 | Breton et al. | 428/422 |
| 4,200,679 | 4/1980 | Klein | 428/402 |
| 4,222,977 | 9/1980 | Dobo | 264/63 |
| 4,239,516 | 12/1980 | Klein | 55/389 |
| 4,311,609 | 1/1982 | Wagner et al. | 252/179 |
| 4,329,157 | 5/1982 | Dobo et al. | 55/16 |
| 4,344,775 | 8/1982 | Klein | 55/75 |
| 4,379,772 | 4/1983 | Solomon et al. | 264/49 |
| 4,384,957 | 5/1983 | Crowder et al. | 210/656 |
| 4,395,332 | 7/1983 | Klein | 210/496 |
| 4,488,969 | 12/1984 | Hou | 210/679 |
| 4,512,897 | 4/1985 | Crowder et al. | 210/656 |
| 4,535,004 | 8/1985 | Haas et al. | 427/212 |
| 4,535,005 | 8/1985 | Haas et al. | 427/212 |
| 4,578,150 | 3/1986 | Hou | 162/164.3 |
| 4,664,683 | 5/1987 | Degen et al. | 55/387 |
| 4,664,812 | 5/1987 | Klein | 210/679 |
| 4,665,050 | 8/1987 | Degen et al. | 502/402 |
| 4,687,573 | 8/1987 | Miller et al. | 210/143 |
| 4,743,373 | 5/1988 | Rai et al. | 210/198.3 |

FOREIGN PATENT DOCUMENTS 0056724 7/1982 European Pat. Off. .

Primary Examiner—William J. Van Balen
Attorney, Agent, or Firm—Parmelee, Bollinger & Bramblett

[57] ABSTRACT

A method of forming a composite material by providing a quantity of first particles of a binder material and a quantity of second particles of a primary material having a softening temperature substantially in excess of the softening temperature of the binder material. The first and second quantities of particles are combined into a substantially uniform mixture. The uniform mixture is heated in the absence of pressure or shear sufficient to convert the binder particles, to a temperature substantially above the softening point of the binder material but less than the softening temperature of the primary material. Thereafter, pressure and shear are applied to the heated mixture sufficient substantially immediately to convert at least a portion of the binder material particles into a substantially continuous webbing structure or force the formation of point-bonds. Substantially immediately after formation of the binder particles into this unique structure, the mixture is rapidly cooled to below the softening point of the binder material to retain the converted binder material in its continuous form or forced point-bonded condition. This produces the composite material composed of primary particles, a binder resin phase forming a continuous web matrix or point bonds, and a volume of empty pores. Also disclosed are products formed by the method.

87 Claims, 2 Drawing Sheets

PROCESS FOR THE PRODUCTION OF MATERIALS AND MATERIALS PRODUCED BY THE PROCESS

RELATED APPLICATION

This is a divisional of copending application Ser. No. 07/455,997 filed on Dec. 22, 1989, now U.S. Pat. No. 5,019,311, which is a continuation-in-part of my copending U.S. application Ser. No. 07/314,651 filed Feb. 23, 1989 for "Process for the Production of Materials by in Situ Fiberizing and Forced Point Bonding and Materials Produced by the Process", now abandoned.

I

TECHNICAL FIELD

This invention relates to a novel method for the production of a large number of previously unobtainable composite materials having a novel continuous polymeric phase or consolidated forced point-bonded composite structure. Particulate binder material is mixed with particulate primary material. The discontinuous particles are then caused to form a continuous web matrix or forced point-bonds of unusual structure and mechanical strength under proper conditions of heat, pressure, and shear.

II

BACKGROUND ART

The only known literature or patent reference that describes a process that could be considered to slightly or remotely resemble that of the present invention, is U.S. Pat. No. 3,796,778 of Gallacher. The disclosure of the Gallacher patent is directed toward the production of a porous mat for use as an artificial leather or fabric, as a porous substrate in batteries or fuel cells, as an industrial membrane, as a bandage, etc.

Gallacher describes a slow process of mixing microparticles of a low temperature melting point thermoplastic with a second powder composed of high temperature melting point plastic. This mixture is then heated and extensively processed by shear for many minutes, usually using a rolling mill. Gallacher fails to teach any adjustment of operating conditions affecting the applied heat, shear, and compression. He discloses a slow, intensive shearing process at low temperatures and very high concentrations of binder resin.

Following the production of fibers from the binder particles, Gallacher dissolves the non-fiberized plastic primary particle component to leave a network of binder fibers with high porosity and tensile strength. This procedure is specifically designed for the production of high-porosity structures composed of binder-resin fibers. In addition, Gallacher utilizes a high binder resin content because he is seeking dense fibrous mats.

Gallacher, in his specific examples, applies compression only after the formation of the fibers to produce a thinner sheet of material. He does not apply intense pressure in conjunction with shear only after heating. Moreover, it takes many minutes for the Gallacher process to produce a fibrous structure which he then compacts to make thinner.

Gallacher focuses on the production of fibrous mats of binder resin and neglects the nonfiberized particles. His interest is directed to primary particles that can be dissolved from the structure to leave the fibrous mat of binder resin. The use of solvents to remove the primary particles is an environmentally unacceptable practice. The disclosure is confined to high-shear rolling, milling, or extrusion processes and to thin structures because his preferred methods and equipment cannot produce bulk shapes or bulk extrusions, a major limitation of his process.

Gallacher does not suggest the retention of the primary particles to form unique materials. Accordingly, he could not produce any of the products or end items, such as ion-exchange cartridges, stainless steel filter media, membrane supports, molded filters, etc. that are potential products of the subject invention, which are produced utilizing temperatures substantially higher than the melting point of the binder resin. Gallacher recommends temperatures well below these temperatures and employs, instead, temperatures approximately equal to the melting point of the binder resin.

In addition to Gallacher, another U.S. patent discloses a "point bonding" technique. This is U.S. Pat. No. 4,664,683 of Degen and Gsell. However, the process disclosed in that patent does not produce the unique structures characteristic of the present invention and the applied temperatures, pressures, and shear during the process are entirely different from those required to produce the continuous polymeric phase and forced point-bonding of the present invention. The Degen et al. technology is basically a low temperature diffusion bonding process.

U.S. Pat. No. 4,664,683 is specific to the point bonding of Whetlerite, or ASC, activated carbon, which is primarily used for defense against chemical warfare agents. Similar impregnated carbons are sometimes used for protection of industrial workers against low molecular weight toxic gases. The process disclosed by such patent appears to be essentially identical to that used by Norit Carbon of the Netherlands for the production of Norithene (a registered trademark of Norit Carbon), which is composed of point-bonded activated carbon that is formed into sheets.

The levels of compression disclosed by Degen et al. are exceedingly low, 0.3–10 psi (0.21–0.703 kg/cm$^2$) most preferred maximum 40 psi (2.91 kg/cm$^2$). Accordingly, it describes process conditions well outside the range of compression utilized in the present invention, which would be 400–1000 psi (28.1–70.31 kg/cm$^2$) for granular materials (i.e. 10–50 mesh) and approximately 8,000 psi (562.48 kg/cm$^2$) or more for powders (typically, 100–600 mesh). Without such higher pressures, the binder resins are not activated and the novel structures produced by the current invention are not obtained.

Degen et al. U.S. Pat. No. 4,664,683 also describes a process using a temperature of approximately 275° F. (135° C.), which is generally below the temperature required in the subject invention to achieve the desired novel structures. Formation of a novel continuous polymer phase or forced point-bonding, according to the present invention, with the lowest melting point resin available, ethylene-vinyl acetate copolymer (EVA), usually occurs at 145° C. for even small bulk shapes and is optimal in the range of 165°–210° C. The temperatures required by the process of the subject invention are therefore substantially higher than required for diffusion bonding processes such as that described by Degen et al., even for the binder resin having the lowest melting point. Degen et al. teach the use of temperatures only sufficient to produce a softening of the binder because they are seeking a point bond and are not seeking a more dramatic conversion of the thermoplastic binder into a different physical form.

According to the Degen et al. disclosure, a low level of compression is applied to the activated carbon and it is then heated. In their process, the mass of carbon is slightly compressed and consolidated prior to the application of heat and the formation of point bonds. Therefore, there is no potential application of shear during heating, which has been found to be a critical condition for the process of the subject invention. The process of the present invention requires the simultaneous application of shear and compression following the heating of the mixture. The point bonding process of Degen et al. reverses this sequence by compressing the mixture while cold and then applying heat to raise the temperature to a level insufficient to produce the formation of a continuous polymeric phase or a forced point-bonded structure.

The point-bonding process described by Degen et al. cannot be applied to fine powders because of the rapid escalation in the quantity of binder resin powder required to achieve point bonding in powders. This is due to the enormous amount of powder surface to be bonded. The Degen et al. process is therefore limited to coarse granular carbons, while the current invention can be efficiently applied to powders composed of particles as small as one micron in diameter.

Another prior art patent, assigned to the same assignee as the Degen et al. patent, is U.S. Pat. No. 4,687,573 of J. D. Miller and M. G. Verrando. This patent describes the immobilization of sorbents to prevent the fluidization of particles within adsorbent systems. One of the primary limitations of all sorbent systems is that they must be operated below the velocity that would result in the fluidization of the sorbent and a loss of staging and possibly a substantial increase in attrition. Miller et al. disclose a system wherein a sorbent is immobilized to substantially eliminate this limitation. The method of immobilization bears no resemblance to the process of the present invention.

U.S. Pat. No. 3,864,124 of E. J. Breton, J. D. Wolf, and D. Worden is typical of a number of similar patents disclosing the use of polytetrafluoroethylene (PTFE) to immobilize a non-fiberizing material. However, none of these are related to the process of the present invention. Many different products are produced using one of several variations on the method described in this patent. All are based upon the immobilization of powders within a matrix of PTFE fibers that are produced by in-situ fibrillation. PTFE is so expensive as to preclude this technique from all but the highest value-added products. Also, PTFE is unique in that it fibrillates without heating or applying substantial compression, but by shear and pulling alone. Such a process is used to produce membranes, porous carbon battery electrodes, and other materials.

The foregoing process using PTFE is complex and time consuming and involves the evolution of fine fibers by mechanically working and shearing a mixture of PTFE and particles. PTFE produces highly toxic fumes when brought to metal sintering temperatures and therefore represents a significant environmental and health problem if used to immobilize metal particles. The PTFE binder particles are 50–560 micrometers, which are generally much larger than the binder particles used in the process of the present invention. The time required to convert these particles into fibers is substantial in comparison to the process of this invention, which is often complete in less than one second. The PTFE method can only produce a thin sheet product and cannot generally be used to form thick structures. It cannot be used to produce extruded or molded products.

Similar methods for the production of immobilized materials using cold-worked PTFE are disclosed in U.S. Pat. No. 4,379,772 of F. Solomon and C. Grun for the production of hydrophobic battery electrodes, and in European Patent Application 0056724 (P. Bernstein et al., MPD Technology Corporation, 28 Jul. 1982) for the immobilization of hydride-forming particles suitable for the storage of hydrogen.

One of the methods reported in the literature for the production of inorganic hollow fibers is the procedure described in U.S. Pat. Nos. 4,222,977 of Dobo and 4,329,157 of Dobo and Graham. Dobo describes a method involving the dispersion of a fine powder such as a metal oxide or metallic powder into a fiber-forming polymer and the extrusion of this polymer-based suspension through a conventional hollow fiber extruder. Sintering the resulting structure results in the production of a fine porous or nonporous metallic hollow fiber. Although the method appears to have been demonstrated in the laboratory, it appears not to have been put into production. The method described by Dobo is not related to the process of this invention.

In summary, there is no known information indicating that the process of this invention has been previously described in the prior art. The process of this invention, and the products produced by the process, are therefore believed to be entirely new and original.

III

DISCLOSURE OF INVENTION

The present invention comprises a process for producing three-phase structures, the three phases comprising primary particles, binder, and air (or gas). One such structure includes a continuous binder-material phase that can, if desired, be converted to microfine fibers by the application of applied shear. Prior to such conversion, the binder is in the form of a thin, substantially continuous film, or "web". Accordingly, it is referred to herein as a "continuous web matrix", or CWM. Another such structure comprises primary particles which are forced to point bond with one another through binder particles under similar process conditions. These are referred to as "forced point-bonds", or FPB. The SWM or FPB of binder materials serve to hold together particles of the desired "primary" material or materials. The process involves the application of heat into, and thereafter sufficient pressure and shear upon, a substantially uniform mixture of a binder in the form of relatively low softening point solid resin particles, and one or more "anvil" materials comprising relatively higher melting point primary particles or fibers. The sizes of the binder particles are within the range of about 0.1 to about 150 micrometers, and are typically 5–20 micrometers, while the sizes of the primary particles are within the range of about 0.1 to about 3,000 micrometers.

The first step in the practice of the process of this invention is to very thoroughly mix together the binder and primary particles. This is important to insure that the binder is sufficiently evenly distributed throughout the primary particles that, upon later conversion, it will entrap or bond to substantially all of them. This will be described in detail below.

After mixing, heat is applied, preferably in the absence of any significant pressure or shear, to raise the temperature of the mixture substantially above the softening point of the binder but below the softening temperature of the primary material. Then, sufficiently high pressure and at least some finite amount of shear are applied to the heated mixture for a short period of time to convert the dispersed binder particles into a substantially continuous web matrix or to cause forced point-bonding. The mixture is then rapidly cooled to a temperature below the softening point of the binder, causing the polymeric binder phase to be frozen in form.

In the CWM version of this process, the mixture of binder and primary particles is converted to a monolithic, consolidated, self-supporting solid form. Generally, at least a portion of the binder particles are converted from generally granular or spherical particles to the described continuous web that is unstable if left at elevated temperature and must b "frozen" by rapid cooling after formation. The primary particles or fibers are entrapped and immobilized within this continuous binder resin matrix and are sometimes bonded to the structure formed from the binder resin. The matrix is a continuous phase but constitutes only a small part, typically 3–6% by weight or 6–30% of the overall volume. Consequently, voids are present within the resulting structure, also as a continuous phase. As a result, the structures formed are permeable and have large volumes of pores filled with air or other atmospheric gas.

An additional feature of the products formed by this process is that they can be "fiberized". The web matrix portion of the resulting structure, when formed from most common crystalline polymers can be converted to a matrix of fibers holding the primary particles in "pockets". This can be achieved through the application of even a mild shear.

In the FPB version of the process of this invention, it has been found that the use of pressure within the lower ranges of those employed for the process leads to the formation of forced point-bonds between the primary particles, rather than a continuous web matrix. Such forced point-bonding can result in structures that have useful properties.

It has been observed that, as the process pressure decreases, the formation of continuous web matrix declines until it is extremely limited. However, the resulting structure can sometimes retain valuable cohesion and strength. This appears to result from the formation of forced point-bonds between the particles.

Under certain conditions, the formation of a continuous polymeric phase within the structure may not be desirable—as in the case of adsorbent structures where low flow resistance is desirable. Furthermore, when the primary particles being employed are too weak to withstand the pressures normally considered optimal for the formation of the continuous web matrix, the use of lower applied pressure is required to prevent crushing of the particles and resultant loss of strength. Under such circumstances, the amount of the web matrix produced may decrease significantly and be replaced with the formation of forced point-bonds.

IV

BRIEF DESCRIPTION OF THE DRAWINGS

The invention or embodiment thereof, is to be described by way of example with reference to the following drawings.

V

GENERAL DESCRIPTION OF THE INVENTION

Figure 1:
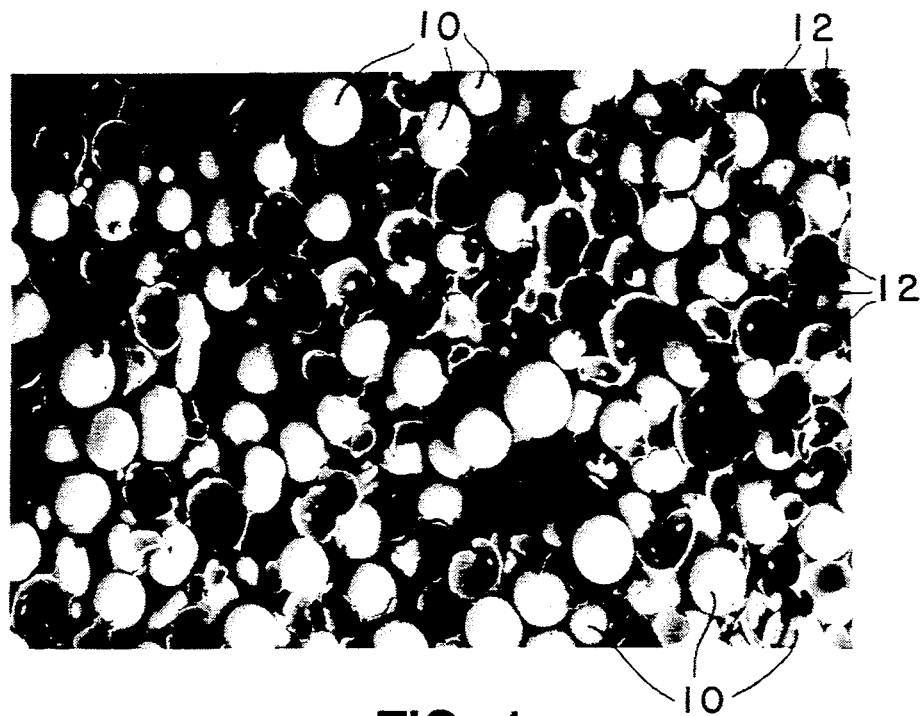
FIG. 1 is a scanning electron micrograph of a quantity of spherical glass beads immobilized in a continuous web matrix of ethylene-vinyl acetate binder resin prepared according to example 25 below wherein a higher than normal quantity of binder resin was used to allow easier observation of the resulting structure.

A. Continuous Web Matrix v. Forced Point-Bonding Structures

The variations in the process conditions described here result in two alternative structures that are distinctly different internally. The major variation in process conditions is the use of either high (generally greater than 4000 psi (281 kg/cm$^2$)) or low (generally greater than 50 psi (3.5 kg/cm$^2$) but less than 4000 psi) pressure to accomplish the process, the remaining process sequence and conditions being generally the same. Low pressure is generally required in the extrusion of certain materials or when processing soft or friable solids that collapse or are crushed by the application of high pressure or are composed of such large particles that the applied pressure is concentrated upon a limited number of particle interfaces and severe particle deformation is observed.

Under these conditions, lower pressure must be used and this pressure may be insufficient to produce the unique continuous web matrix (CWM) structure Instead, a cohesive and strong structure can be produced under select circumstances, but this structure is composed of what appear to be point-bonded particles. In many cases involving porous materials such as activated carbon, activated aluminas, and similar porous adsorbents, the binding agent is forced into the macropores and exterior voids of the individual primary particles to form physical connections between particles. This "forced point-bonding" (FPB) results in structures that are generally more fragile than those having the continuous web matrix structure. However, such structures often have sufficient strength to be useful in commercial applications. Materials having FPB structures are produced on the same equipment and under the same process steps and conditions as materials having the CWM structure, except that the maximum applied pressure is within the lower range of pressures.

Structures lacking the CWM structure and having the FPB structure disintegrate when they experience a severe stress. They are not suitable for use in such applications as buffing wheels, where they can undergo brittle fracture. FPB structures often have excellent compressional strength when manufactured in thick cross sections. They have only a small elongation before yield in tension and lack the rubbery characteristics of CWM materials. CWM material can have over 100% elongation before yield in select circumstances, whereas FPB materials generally have less than 10% elongation before yield.

One of the advantages of the FPB process is that it is sometimes possible to obtain an immobilized powder structure when the interfacial character of the particles, or their physical strength, is insufficient to support the formation of the CWM structure. The formation of an FPB structure is usually possible when handling porous solids that provide sites allowing binder to be pressed into physical voids on the surface of the primary particles. The pressure required for this process remains substantial and in most cases is at least several hundred psi and optimally greater than 500 psi (35 kg/cm$^2$). The formation of an exacting and stable mixture of binder and particles is not as critical, but generally remains important, in the FPB process.

B. Post Processing Fiberization

Materials having the FPB structure fracture when they experience a sufficiently large applied force (stress). However, CWM materials have the unique characteristic that the binder within these structures, when a crystalline polymer, can be converted to a dense matrix of fibers by the application of stress to the structure. Such stress can be the result of pulling, cutting, or compressing the CWM structure. When pulled, a dense mat of fibers is created within the structure at the site of the structure's elongation and yield and the severed ends of the structure show characteristic fibers emerging from the severed edges. The formation of fibers can be observed as much as a millimeter from the torn edge. Even when the structure is cut with a sharp razor, the applied stress causes the formation of fibers deep into the structure and as much as 0.5 millimeters from the cut edge.

Bulk conversion of a CWM structure into a dense fibrous matrix is possible. For example, a 1 inch (2.54 cm) diameter and 1 inch tall solid cylinder of spherical glass beads immobilized within a CWM composed of FE532 ethylene-vinyl acetate copolymer was compression insert molded around a steel shaft. The resulting part initially had a hard plastic character and was very strong. It was mounted on a drill press and forced against a block of steel while rotating at high speed. After removal from the drill press, the exterior of the part was found to be completely converted into a material with long fibers. The plastic-like character of the part was changed to a soft rubbery character. Fibers had been formed to the full depth of the structure and the exterior surface was soft and furry.

C. Binder Materials

The binder can be composed of nearly any thermoplastic material including, for example: polyolefins such as polyethylene, polypropylene, polybutene-1, and poly-4-methylpentene-1; polyvinyls such as polyvinyl chloride, polyvinyl fluoride, and polyvinylidene chloride; polyvinyl esters such as polyvinyl acetate, polyvinyl proprionate, and polyvinyl pyrrolidone; polyvinyl ethers; polyvinyl sulfates; polyvinyl phosphates; polyvinyl amines; polyoxidiazoles; polytriazols; polycarbodiimides; copolymers and block interpolymers such as ethylene-vinyl acetate copolymers; polysulfones; polycarbonates; polyethers such as polyethylene oxide, polymethylene oxide, and polypropylene oxide; polyarylene oxides; polyesters, including polyarylates such as polyethylene terphthalate, polyimides, and variations on these and other polymers having substituted groups such as hydroxyl, halogen, lower alkyl groups, lower alkoxy groups, monocyclic aryl groups, and the like and other thermoplastic meltable solid materials.

Less desirable, but potentially applicable, are polymers such as polystyrenes and acrylonitrile-styrene copolymers, styrene-butadiene copolymers, and other noncrystalline or amorphous polymers and structures. It has been found that crystalline polymers are generally preferred for the production of fibers from the CWM phase. Amorphous polymers are generally more difficult, and sometimes nearly impossible, to convert to fibers using this method. However, they can be readily formed into the unique CWM structures that impart great strength to these composites. For example, microfine acrylic resin binder has been shown to be generally resistant to conversion to fiber. However, such noncrystalline or amorphous polymers are suitable for forming strong composites incorporating the characteristic continuous web matrix of this invention. These structures will not necessarily have substantial elongation prior to yield. A typical example is the use of an amorphous polymethacrylate produced by emulsion polymerization to bind stainless steel particles. The resulting structure is "rock hard" but cannot be converted to fibers by applied stress. Such structures have the microstructure of CWM materials but the physical behaviour of unusually strong FPB structures.

D. Structures Produced

The structures produced by the CWM and FPB processes may have the physical properties of soft or hard rubber or may exhibit the characteristics of a brittle material resembling a ceramic body. For example, stainless steel powders processed by the CWM method may resemble a sheet of butyl rubber, although the actual composition of the sheet is 95% metal. Alternatively, very fine polymeric particles can be mixed with organic fibers and binder particles to produce complex composites which are stiff and have high tensile strength. Fibers, when used as a part of the original mixture, are preferably chopped to lengths no longer than approximately 5 mm, although longer fibers are tolerated in small volumes. Absorbent powders and granules can be molded, extruded, or formed into thin sheets where the binder material is present in small amounts.

These materials can be processed to achieve stiff and brittle structures or soft and rubbery structures. In some cases, the degree of binder resin web matrix formation can be adjusted with depth through the solid mass to provide highly matrixed interior structures and lightly matrixed exterior structures. In addition, the edges of the structure can be processed to achieve smooth surfaces that will not release either particles or fibers, even under severe stress.

E. Primary Particles

The range of potential materials that can serve as primary particles or fibers and that can be potentially immobilized using the CWM and FPB processes is essentially limitless. Materials immobilized can include metallic particles of 410, 304, and 316 stainless steel, copper, aluminum and nickel powders, ferromagnetic materials, activated alumina, activated carbon, silica gel, acrylic powders and fibers, cellulose fibers, glass beads, various abrasives, common minerals such as silica, wood chips, ion-exchange resins, ceramics, zeolites, diatomaceous earth, polyester particles and fibers, and particles of engineering resins such as polycarbonate.

It should be noted that the CWM and FPB processes are generally applicable to primary particles in the size range of 0.1 to 3,000 micrometers in diameter and fibers of 0.1 to 250 micrometers in diameter of essentially unlimited length to width ratio. As pointed out above, however, primary fibers are preferably chopped to no more than 5 mm in length. Candidate fibers or powders must have sufficient thermal conductivity to allow heating of the powder mixtures. In addition, the primary particles and fibers must have melting points sufficiently above the melting point of the binder resin to prevent both substances from melting and producing a continuous melted phase rather than the usually desired three or more phase system of continuous binder web, usually point-contact continuous primary particles or fibers, and continuous-phase open spaces.

F. Benefits of Surface Active Agent Treatment

One of the requirements for the production of strong and uniform structures using the process described herein is the formation of a stable mixture of binder and primary particles prior to processing. It has been generally found that the methods used to produce this uniform mixture and the characteristics of the particles used in the process must produce a mixture where binder particles assume a stable attachment to the primary particles. Without the prior formation of a stabilized mixture of particles, both the FPB and CWM processes are nearly impossible to accomplish. Binder attachment to the primary particles can result in the stabilization of mixtures of primary particles that would normally segregate as a result of differences in density or particle morphology. For example, stable mixtures of 410 stainless steel particles and smooth, hard, and spherical ion-exchange resin beads can be produced when the method of mixing is optimized and the binder or primary particles are chemically treated.

It has often been found that binder particles produced by emulsion polymerization have performance in the process of this invention superior to particles produced by alternative methods. For example, particles of polyethylene resins produced by emulsion polymerization are effective in the process but particles produced by grinding are usually not effective. In addition, primary particles having smooth exterior surfaces and hydrophobic characteristics can, in select circumstances, resist the formation of both FPB and CWM structures. For example, XAD-16 is a nunfunctionalized adsorbent resin produced by the Rohm & Haas Company (Philadelphia, Pa.). This resin is extremely hydrophobic and, when in the form of a micronized powder or as the original resin beads, was found to resist the formation of a bonded structure when mixed with stainless steel particles under process conditions that were normally fully effective for other materials. However, this problem could be overcome through the immersion of the resin in a solution of 1% linear alkyl ethoxylate in methanol and then air drying. The treated resin could then be roll compacted into continuous sheets having CWM structures when formulated with 25% by weight 410 stainless steel and 12% by weight ethylene-vinyl acetate copolymer binder.

The formation of stable mixtures under the unique conditions of high intensity mixing and surface treatment described herein allows mixtures of particles to be handled that usually undergo severe separation or segregation because of differences in density, particle morphology, or size. For example, stable mixtures can be produced between particles having densities that differ by more than a factor of ten. Smooth spherical particles can be mixed with particles having a fibrous or substantially nonspherical character. Particles whose size varies by a factor of 1,000 have been mixed and maintained as stable mixtures.

G. High Shear Mixing

It has been found that low-shear mixing, such as within a ribbon blender or conventional ball mill, is insufficient to produce a stable mixture of binder and primary particles within a reasonable amount of time. Without the production of a specific structure during mixing, the process is ineffective and cohesive and strong structures cannot be produced by the process. Not only must the binder particle or primary particle have specific characteristics, such as those produced by the presence of surface active agents, but mixing must be sufficiently violent to produce a condition where binder particles and primary particles have formed stable attachments. These "prebonds" are sufficient to produce microaggregates that substantially alter the flow and dusting characteristics of the particles within the mixture. Violent mixing is also required to break apart binder particle aggregates that are often quite stable and to force reattachment of these binder particles to the primary particles.

Correct methods of mixing produce a material composed of microaggregates of primary particles and binder particles, and these aggregates have a reduced tendency to release dust when handled. An experienced operator can also readily notice a reduction in the flow characteristics of the powder mixture that indicates the formation of the desired bonds between particles. Samples smeared on a black surface show no residual binder aggregates which would be indicated by the presence of small white streaks.

Poorly mixed material, or use of binder or primary particles lacking the ability to form stable "prebonds", results in mixtures where binder and primary particles separate, or where primary particles of widely varying density or morphology separate because stable aggregates have not been formed. It is these stable aggregates, formed during mixing, that allow this process to bond particles that cannot normally be maintained in a stable mixture. It appears that, as a rule, the process is generally not workable with poorly mixed materials or with materials in which the binder particles have not become attached to the primary particles during the mixing step.

It has been found that adequate mixing can be accomplished if a ball mill is modified to have one or more (usually two) sets of steel rods placed along its periphery. The balls rotating within the mill are lifted by one set of steel rods and allowed to drop down upon the powder that has accumulated upon the surface of a second set of steel rods. The rods work well when they are threaded such that the powder is smashed between the threads of the rods and the falling balls. This action substantially amplifies the violence of the ball mill's action and within a short period of time (usually less than three hours) will produce the required microaggregated mixture.

To economically mix larger volumes of material, a conventional ribbon blender can be modified to use a series of high shear plows that press and shear over a period of time. High loading rates are required to obtain good mixing in such systems and partial loads of powder can often not be mixed effectively.

When mixtures of powders and fibers must be produced, it is often necessary to use fibers of short length (less than 4 mm and optimally less than 2 mm). To break fiber bundles, a dry high speed blade mixer may be required. Following the breakdown of any fiber aggregates, the powder and fiber mixture can be processed in ball mills or plow mixers.

VI

DETAILED DESCRIPTION OF CWM/FPB PROCESS

A. General

During the CWM/FPB process, at least one type of "binder" particle, consisting of microfine particulate material, usually a thermoplastic powder resin, is mixed with one or more types of "primary" particles or one or more types of primary fibers. The primary particles and fibers can consist of nearly any granular, powdered, or microfine material or a range of fine or coarse fibers. Primary particles and fibers should have melting or softening points significantly higher than those of the binder particles. To this mixture can be added a variety of additives and processing aids. "Additives" are defined as materials that produce desirable changes in the properties of the final product, such as plasticizers that produce a more elastic or rubbery consistency, or stiffeners that produce a strong, brittle, and more ceramic-like final product. "Processing aids" are defined as materials that allow the mixture to be processed with greater ease, such as lubricants for injection molding. The binder should constitute about 3 to about 30% by weight of the overall mixture and, preferably, about 4 to about 8%.

The mixing process typically used to mix binder and primary materials is designed to produce as uniform a final product as possible. The quality of the mixture produced by the mixing equipment has been found to be quite important in the process. The cold mixing process usually requires substantial levels of shear to produce a stable, intimate mixture that will be converted to a strong composite during final processing. For example, ball milling must often be carried out in a modified ball mill equipped with devices to increase shear. Plow mixers must also be modified with devices that "smear" the materials. It has been found that the preferred thermoplastic binder resins used in the CWM process often form agglomerates that must be thoroughly dispersed to provide a uniform mixture suitable for the process. Conventional mixing of material with these binder resins often fails to produce a truly uniform product but instead leads to further agglomeration of the binder particles and separation of the mixture's components. However, it has been found that essentially all powder mixtures (those not containing significant quantities of long fibers) can be effectively mixed using a modified ball mill or plow mixer, while mixtures of fibers and particles can be effectively dispersed in a high-intensity mincing mixer.

In addition, it is suspected that the CWM and FPB process requires a special distribution of particles within the mixture. Binder particles must be dispersed individually or as small clusters between and upon the surrounding primary particles The binder particles must stick to the primary particles in an effect that produces a low-dusting, slow moving matrix. To supplement this stickiness, binder or primary particles sometimes need to be coated with a trace of surfactant or similar material.

The resulting mixture, once all particles and components have been substantially uniformly dispersed, is then processed in accordance with the invention by a procedure which may include any of a number of conventional processes often applied to plastics. These include extruding to produce objects with two dimensional uniform shapes, hot roll compacting to produce thin sheets or thick slabs of material, or compression or injection molding to produce complex bulk shapes. The CWM process therefore allows the processing of essentially any particulate or fibrous material into the same monolithic physical forms obtainable from plastic resins.

To accomplish the formation of the unique continuous web of the binder resin and the immobilization or forced point-bonding of the primary particles or fibers, the plastics molding, extruding, roll compacting, or other forming equipment is operated in such a manner as to obtain a critical combination of applied pressure, temperature, and shear in a required time sequence. The conditions required to convert the binder particles from their original, normally powder or spherical particulate form, into a thin, continuous web matrix within the final structure varies according to the type of resin used. However, the basic requirements include the following steps.

1. In the absence of any significant pressure or shear, the mixture is first brought to a temperature sufficiently above (preferably at least about 20° C., most preferably about 40° C. above) the softening point of the binder resin but normally below the softening point of the primary particles and fibers within the mixture.

2. After being heated to at least the temperature of step 1, the mixture is placed under sufficient applied pressure, generally at least about 50 psi (3.5 kg/cm$^2$), preferably at least about 1000 psi (70.31 kg/cm$^2$) and most preferably at least about 6,000 psi (421.86 kg/cm$^2$) to substantially immediately consolidate the loose material and work the binder resin by the surrounding primary particles to convert at least a portion of said binder material particles into a continuous web between the primary particles. The applied pressure must be sufficient to "activate" the binder and is applied only upon reaching the necessary temperature as mentioned in step 1.

3. The mixture must undergo at least some minimal (finite) shear during the application of pressure, even if the shear is simply the movement of the particles required to consolidate the mass from its originally loose form into a more compact form. It is believed that this serves to "smear" the particles of binder into thin films which coalesce with one another to form a continuous web matrix. During extrusion, although the particles would be preconsolidated during heating in the die, the material experiences a combination of shear and pressure in the final forming portion of the die where temperature, pressure drop, and shear are sufficient to accomplish the conversion of the binder.

4. The application of heat and pressure must be of sufficiently short duration that the continuous web formed during the process does not revert to a non-continuous condition as a result of melting and reconsolidation into individual droplets or particles.

5. The process is conducted at great speed and then the resulting immobilized material is relatively quickly cooled to a temperature below the melting point of the binder to "freeze" the unstable structure once it is formed.

In the FPB embodiment of this invention, the applied pressure in step 2 is in the lower range such that the formation of a continuous web decreases or ceases and the composite structure is formed by forced point-bonding between the primary particles. The application of heat and pressure in the FPB process is also of short duration and the cooling is relatively quick so that the forced point-bonds formed during the process are retained.

The exact mechanism resulting in the formation of the continuous web matrix in the CWM process is not fully understood. One hypothesis is that the binder resin particles have formed a surface coating on the surface of the primary particles. The application of intense pressure and shear results in the flow of the low melting temperature binder during the first moments of shear and pressure. The flow and shear experienced by the binder resin produces a continuous network, or web, of binder throughout the pores between the primary particles. This structure is not stable but may momentarily solidify at the very high pressure eventually achieved within the structure. When the pressure is released and the temperature is allowed to decrease rapidly, the structure is retained in the final product. If the structure is not cooled rapidly, the continuous binder resin network disintegrates and structural integrity is diminished or, in most cases, entirely lost. If this hypothetical description is correct, this process may be expected to be applicable to many thermoplastics and, preferably, to thermoplastics with crystalline structures whose flow would strongly depend upon applied pressure.

Regardless of the mechanism by which the continuous web is created, the CWM process can be completed extremely rapidly and the network of binder resin appears to be formed nearly instantaneously upon application of sufficient pressure and shear. For example, thin sheets of powdered stainless steel can be produced using the CWM process by passing a mixture of fine stainless steel powder and a binder resin through a roll compactor having heated rolls. In this process, the estimated time required for the mixture of powders to enter the nip zone of the compactor and emerge as a flat sheet of 150–300 micrometers thickness is calculated to be less then 0.5 second. An examination of the product demonstrates the production of a continuous web of polymeric material within the pores between the steel powder particles.

FIG. 1 illustrates a CWM sheet comprising glass spheres 10 contained within a continuous web matrix 12. This is a photograph of a sheet fractured under liquid nitrogen.

Figure 2:
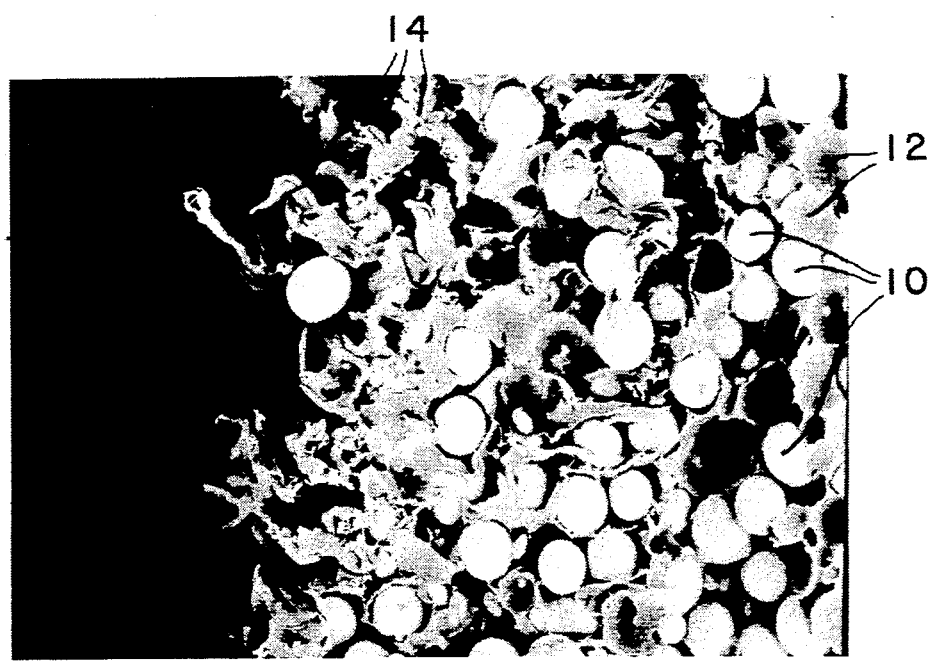
FIG. 2 is a second scanning electron micrograph of a matrix of spherical glass beads immobilized in a continuous web matrix of binder material wherein the surface of the structure has been cut with a sharp instrument.
Figure 3:
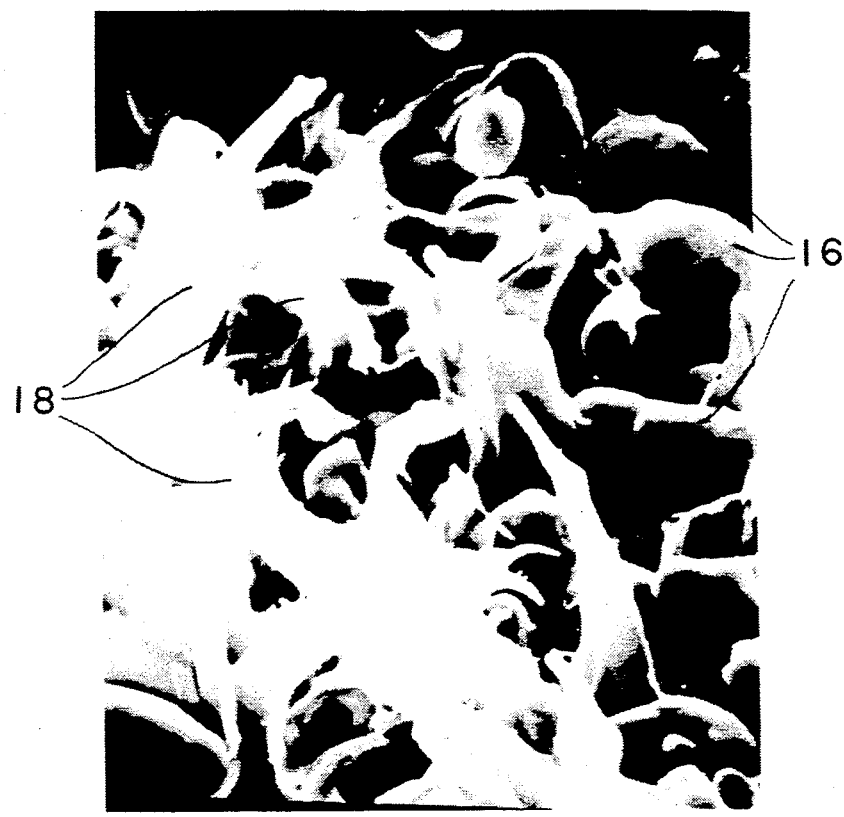
FIG. 3 is a scanning electron micrograph (1500×) of a torn edge of a material produced in accordance with Example 32 of this specification and containing 95% stainless steel particles embedded in a continuous web matrix of ethylene-vinyl acetate copolymer.

One characteristic of CWM-formed materials manufactured using common crystalline binder resins is that pulling, cutting, or applying a stress to the structure converts the fine web of polymer into very fine fibers. The resulting fibers can sometimes be very fine and fibrillated into even submicron sizes. Such a structure is shown in FIG. 2 which illustrates a sheet similar to that of FIG. 1 which has been cut, creating fibers 14 at the cut surface. FIG. 3 shows a sheet of stainless steel particles 16 which has been ripped, resulting in formation of fibers 18.

The speed of the CWM and FPB process appears to be limited primarily by the speed with which heat can be moved into the mixture of particles. The formation of the continuous polymeric web or forced point-bonds appears to require only a momentary application of high pressure and shear. It has been shown that, if the product of the CWM or FPB processes is held for an extended period at the elevated temperature, there is a rapid deterioration of the product and loss of the continuous web or binding points. Therefore, following the formation of continuous binder resin structure in the CWM product or bonding points in the FPB product, the material should be cooled rapidly, preferably as rapidly as possible. Prior to the complete cooling of the product, the structure remains soft and can be deformed easily. The product is therefore usually allowed to partially cool somewhat prior to removal from the mold or emergence from the extrusion tool. In this warm condition, the product can sometimes be manipulated to produce a fine surface finish or a smoothed sheet. Water sprays or air blasts may be used to hasten cooling. Flat sheets produced on a hot roll compactor are allowed to cool during their travel several feet from the roll prior to being manipulated. In some cases, sheets of the material are further processed for flatness while still warm and pliable.

The product of the CWM and FPB process can be a rubbery or plastic material whose properties can be varied widely through the use of higher or lower pressure and shear, higher or lower temperature, and through the use of various additives that, in small amounts, substantially change the properties of the product. The typical structure produced by the CWM process is shown in FIG. 1. It is composed of spherical glass beads 10 within a continuous web of binder resin 12 (ethylene-vinyl acetate). The concentration of binder has been increased to 20% by weight to allow easier viewing of the resulting structure but such structures can be produced with quantities of binder as low as 6% by weight.

It has been observed that increasing the pressure and applied shear upon the mixture will result in a substantial increase in the degree of continuity of the binder resin within the product structure. The thickness of the web produced by an applied stress appears to decline as temperature is increased from a minimum temperature to a maximum temperature. Above a certain temperature, the resulting matrix formation is observed to decline. It is suspected that, above a critical temperature, the continuous structure formed by the CWM process cannot cool quickly enough below a "melt flow" temperature and the continuous web is lost due to subsequent flow back into globular form.

The CWM and FPB process is therefore usually carried out within a preferred operational temperature range. This range may vary with the size and shape of the object being produced. For example, thin sheets that can be heated and cooled very quickly can be formed at lower temperatures than larger slabs or bulk shapes. Stainless steel sheets containing 5% by weight ethylene-vinyl acetate (EVA) (melting point approximately 100°–130° C.) can be formed by the CWM process at temperatures of 150° C., while larger plugs of the same material that are 0.5 inch (1.3 cm) in diameter cannot be processed below 180° C. The allowed temperature range therefore becomes more limited as the size of the object being formed increases. In practice, objects up to 2 inches (5.1 cm) in thickness can be formed within a practical temperature range. However, the ability to carry out the process declines with increasing thickness of the product as the required temperature rises and the ability to cool quickly is lost.

It has been found that a minimum applied pressure and significant shear are required to "activate" the CWM process. Below a critical pressure, no continuous binder structure is observed to occur. Forced point-bonding of the particles can, however, still occur. Forced point-bonding of the primary particles by the binder resin produces a material having substantially different physical properties than those produced by the CWM embodiment of the process. The CWM process produces materials that are extremely rubbery, often nearly indistinguishable from common hard rubber. In addition, the microstructures of the two materials are entirely different. The primary particles of CWM-processed materials are generally trapped within an array of fine continuous webbing that bridges the particles. FPB materials have adhesive-like bonds between the particles caused by the melting of the binder resin and squeezing of this material to a point insufficient to consolidate into a continuous web. These bonded structures exhibit much lower strength than the materials produced by the CWM process which, although the binder represents only a small proportion of the structure by weight, can have structural properties similar to rubber, wood, or ceramic.

As stated, forced point-bonding is generally accomplished using the conditions and sequence of steps specified for the CWM process but results in a structure that lacks the characteristic continuous binder webbing normally produced as a result of the CWM process. This is believed to be either because the process conditions have been altered to the lower portion of the CWM range where the production of a continuous structure declines and the production of forced point-bonds becomes dominant, or because a binder resin has been selected that resists conversion to a continuous binder phase and only forced point-bonding is possible. In either case, the process retains all of the usual characteristics of the CWM process as it can be implemented on the same type of equipment, using similar or perhaps identical process conditions. Apparently, either a reduction in pressure or a change in resin causes a cessation of continuous binder phase formation but results in the formation of strong forced point-bonding between the primary particles. Most FPB products fracture when bent to small angles (usually less than 30-45°) and would be considered brittle in comparison with those containing the continuous polymer phase. However, FPB materials are desirable for immobilizing certain adsorbents. CWM materials can often be bent to large angles and in some cases have the flexibility of conventional rubber or paper.

Ceramic-like materials can be produced using the process by employing small primary particles having complex convoluted shapes that can effectively interlock (diatomaceous earth is a good example), and by operating the process at high temperatures and high pressure. The resulting material is extremely rigid and brittle. Such structures are particularly desirable in certain processes where a product that retains its shape is required, as in the case of extruded structures or molded objects.

It is also possible to produce an immobilized mixture of metal powder and a granular or powdered abrasive or polishing compound such as silicon carbide, alumina, and the like. The metal particles are preferably about one-tenth the average size of the abrasive particles. The abrasive particles, metal powder and binder material are typically mixed in ratios of 65%, 25%, and 10%, respectively. They are formed under the hereinbefore described conditions, for example at 8000 psi (562.48 kg/cm$^2$) and 210° C. The formed sheet, slabs, or blocks are then sintered at a temperature and for a period of time sufficient to force the diffusion bonding of the metal particles within the structure. The result is a metal-bonded abrasive structure suitable for use as a grinding wheel, as sanding paper, or in other grinding, polishing or sanding applications. The ratio of metal, abrasive, and binder can be varied and the particles of abrasive can be from 1 to 1500 micrometers in diameter. The metal powder can be any of a variety of steels and stainless steel or softer metals such as copper, bronze, or brass powders. The advantage of the new product material is its ease of production and its extremely high strength and operating temperature capabilities. The material can be formed in a variety of thin and thick structures suitable for use with orbital and rotary sanders, grinding wheels, high-speed polishing tools, and the like. When sintered, the metal particles fall back from the surface of the material as the metal consolidates, while the abrasive particles are left sticking out from the surface. The resulting structure is highly desirable for abrasive applications.

Extremely rubbery structures can be produced by using spherical particles that have a limited ability to form interlocking structures. The flexibility of the product appears to depend primarily upon the character of the primary particles. Next, the structure of the continuous binder resin web produced by the CWM process substantially affects the rigidity of the structure. The character of this web can be substantially controlled by varying pressure, temperature, and shear applied during processing.

Polytetrafluroethylene-coated steel air filters can be produced by the formation of thin sheets of porous stainless steel using the method described for roll compaction of stainless steel powders. These sheets of porous stainless steel can be coated with a very thin layer of polytetrafluroethylene (PTFE), approximately 0.5 to 1.0 micrometer thick. This coating produces a hydrophobic character that allows the sheet to pass air but effectively prevents the free passage of water at modest pressures (1-2 psi or less). The resulting sheets can be formed into filter bags suitable for industrial applications or use in household vacuum cleaners. The waterproof characteristic allows these filter bags to handle both wet and dry spills and allows the filters to be easily cleaned because of the non-stick PTFE surface. The PTFE coating can be applied either before the production of the bag filter (on the original sheet of porous steel) or can be applied to the final filtration structure after fabrication. The PTFE is applied using conventional methods by spraying or dipping the structure into an emulsion of PTFE and curing the coating at elevated temperature.

The addition into the structure of primary fibers such as those of cellulose, acrylic, nylon, or aramid also leads to stiff structures with high tensile strength. Certain additives, such as fumed silica, when added to the original powder/fiber formulation, have been shown to significantly alter the stiffness of the resulting product. For example, the addition of 2% by weight of fumed silica to a mixture of diatomaceous earth and EVA binder produces a structure with significantly improved strength.

Certain additives can also serve as processing aids. For example, the addition of a small quantity of polyethylene glycol (PEG) of 400 to 6000 molecular weight to a mixture of stainless steel and EVA produces a material that flows smoothly through small orifices and is expected to allow injection molding of such mixtures. The PEG also increases the rubbery character of the product by acting as a lubricant within the structure and by serving as a plasticizer to the binder resin structure formed during the CWM process. The resulting structure is like a strong soft rubber and the material can be stretched like a rubber band, even though it is composed of over 90% stainless steel powder.

The compositions produced according to the CWM process of this invention are quite different from the compositions produced by the prior art processes. For example, the compositions of this invention are characterized by a continuous matrix of binder resin that is present in small amounts with large amounts of air (or other atmospheric gas) filling the remaining voids between the primary particles. The binder resin structure is readily converted into fibers by the application of stress. The resulting structure may have a unique multi-stage fibrillation comprising many relatively large and highly stressed primary fibers that further fibrillate into micro fibers. In addition, in the fibrous compositions of this invention, the primary particles are consolidated by pressure into a high density and uniform matrix with binder webbing or micro fibers present within the pores remaining between the primary particles.

Some of the desirable characteristics of the CWM and FPB process and the materials produced by the CWM and FPB process include the following.

The process can be carried out with great speed using standard equipment used for the production of plastic sheets and parts. In the case of roll compaction, a cold powder mixture can be converted from a loose powder form into a continuous sheet during passage through the nip zone of the heated rolls—less than one second.

The process can be used to immobilize nearly any granular, powdered, or fibrous material or any mixture of such materials, without regard to their properties except that they not melt at the temperature used in the CWM process.

A wide range of binder resins can be used in the CWM and FPB process, ranging from low cost and low melting point resins such as polyethylene, polypropylene, and the copolymer of ethylene-vinyl acetate to higher melting point resins such as nylon, polycarbonate, polysulfone, etc. As a result, the structures formed from the binder resin can have the properties of nearly any desired thermoplastic.

The CWM and FPB process produces microporous structures that can be used for a wide range of applications. The webbing or fibers formed by the CWM process have characteristics desirable for particulate filtration and can be used within particulate filters. Alternatively, these processes are cost-effective and convenient methods for immobilizing powders of, for example, stainless steel, to allow the production of complex or very fine and thin sheets of such powders. Later, the binder can be removed by heating the product of the CWM process in a sintering oven to leave a porous stainless steel sheet or part.

The CWM process is carried out with such speed and under sufficiently gentle conditions, that the integrity and adsorption capacity of adsorbents immobilized within the matrix of binder resin remains essentially unchanged.

The process can be used to produce mixtures of particles that are normally not compatible. For example, a mixture of ion exchange resin and a magnetic stainless steel powder can be combined to form a magnetic ion-exchange resin composite particle. This is made possible by the discovery that binder resin particles and treatment with trace quantities of alkyl ethoxalate type surfactants can yield stable mixtures of particles of very different densities that can be processed into a uniform product. Alternatively, sorbent particles can be formed into sheets, slabs, or bulk shapes, or can be molded directly into retaining structures (such as cartridges or pressure vessels). If molded into a container, the particles are both captured within the CWM structure that is spontaneously formed during the molding process, and also bonded to the walls of the container to produce a high-integrity structure that can not settle, shift, channel, or undergo attrition.

The products of CWM technology can be given the physical characteristics desirable for abrasive structures, for building materials, or for other high-stress applications. For example, the CWM process can be used to produce a thick pad of a hard rubbery material containing 90% or more by weight abrasive particles. These can be used as long-lasting abrasive pads on orbital sanders. The shear produced by use converts the web matrix into fibers, as explained above. The fibers thus formed within the CWM abrasive structure appear to vibrate during the sanding process to reject the entry of contaminant particles and fibers. This allows the pad to be used nearly indefinitely without the accumulation of materials that might hinder the proper functioning of the abrasive. Alternatively, the CWM process can be used to produce thick slabs of low cost materials such as sand or gypsum that have structures that behave in a manner similar to wood for use as wallboard materials that can be nailed and handled without fracturing. The CWM process can be used to re-form sawdust into structural shapes suitable for use in construction. Waste materials can be processed into useful products.

An advantage of the CWM and FPB process of this invention is that it can be conducted using a variety of modified conventional plastics processing equipment and techniques such as, for example, compression molding, extrusion, roll compaction and the like as discussed hereinafter, by modifying the process equipment to carry out the CWM and FPB processes.

B. Compression Molding

The exact procedure used in the production of CWM compression molded materials varies according to the size and shape of the desired product and the technique chosen for its production. For example, compression molding is normally accomplished by pouring a measured quantity of the original, unconsolidated, powder mixture into a heated mold. If the object is large, the mold is preheated for a period of time or, once filled with powder, may again be preheated for a period sufficient to allow the powder to reach the desired working temperature. During heating, no pressure is applied and no effort is made to consolidate the powder. The powder must be at the desired temperature before pressure and shear are applied.

Once the powder has reached the desired temperature, the mold is closed and brought to high pressure as quickly as possible. The results of the CWM process appear to depend upon the maximum pressure achieved and do not appear substantially to depend upon the rate at which the pressure changes. Pressures of approximately 8,000 psi (562.48 kg/cm$^2$) upon the surface of the part are desirable, although pressures as low as about 4000 psi (281 kg/cm$^2$) continue to produce the unique continuous binder polymer structure in loose powders and greater than 500 psi (35.16 kg/cm$^2$) in large granules. The higher the pressure, the better the results of the CWM process.

Once the desired pressure has been achieved, the pressure is removed and the part is allowed to cool as quickly as possible. Once cooled from the elevated CWM processing temperature to below the melting point of the binder resin, the part is ejected from the mold. Alternatively, the part can be ejected from the mold while hot but must be handled carefully as it remains soft and pliable until cooled below the softening point of the binder resin.

C. Extrusion

The CWM and FPB process can be carried out in a modified conventional screw extruder. To conduct the CWM process in an extruder, the binder particles and primary particles or fibers are first mixed in a high-intensity mixer such as a ball mill or plow mixer. The mixture is fed into a modified screw extruder capable of providing high working pressures of up to about 6,000-20,000 psi (421.86-1406.2 kg/cm$^2$).

The extruder is normally modified to operate a smaller diameter screw within a barrel normally sized for a larger screw, e.g. operating a 2.5 inch (6.4 cm) screw within a thick barrel designed to withstand high pressure. The screw is modified to provide high pressure plug flow of solids and may have a feed, compression and metering section or may have an auger-like design. The barrel of the extruder is modified to operate at room temperature or to provide mild preheating and the powder is transported through the barrel at a temperature below the softening point of the binder resin. Heat resulting from friction within the barrel is removed by the circulation of coolant through both the screw and barrel.

The die used for the extrusion of CWM and FPB materials is usually built in two parts, the first being a preheating and forming section and the second being a cooling and swaging section In the first section of the die, the dimensions of the die cavity are brought to the size and shape of the final part cross section while the walls of the die are intensely heated. As the CWM material enters the smallest cross section of the die, the polymer undergoes intense shear and pressure at the appropriate temperature and conversion of the binder from discontinuous particles into a continuous polymeric structure takes place. Pressure within this portion of the die is normally about 6,000-12,000 psi (421.86-843.72 kg/cm$^2$) and the temperature is usually about 25°-100° C. above the binder polymer's melting point. After forming, the shape may pass through a thermal isolator composed of a ceramic plate and then enters a second die section where the cross section of the die can be made slightly smaller than the size of the formed part and the material is swaged to the final size and dimensions. This section of the die is intensively cooled and the swaging action acts to enhance heat transfer. The cooled shape emerges from the die and may be further cooled by water spray or cold compressed air.

Hydraulic ram extruders are generally less desirable, although they can supply high process pressures. Hydraulic ram extruders operate with discontinuous action and this makes the timing of the CWM process difficult to maintain. If the CWM material is allowed to remain within the heated section of the die, the binder can coalesce and the structure of the material rapidly deteriorates. Cooling of the immobilized shape must be accomplished rapidly and immediately.

The speed of extrusion is generally limited by the rate of heating of the powder in the heating section of the die. The formation of the continuous polymeric phase in the "forming" section is believed to be nearly instantaneous. If heating is not the rate-limiting step, then the limitation upon the speed of the process is the distance required for the powder to be shaped from the bore of the extruder into its final shape. Too rapid a change in bore dimensions results in operating pressures greater than those permissible on the extruder. Too slow a change in bore dimensions can result in both a low operating pressure, perhaps below that required to activate the CWM process, and a loss of productivity and an increase in extrusion tool cost.

CWM powder mixtures normally contain primary particles in an amount substantially greater than 85% and are generally composed of a three-phase flow of solid particles or fibers, binder resin particles, and air (the quantity of binder is insufficient to fill the pores between the primary particles and air fills these pores). Accordingly, the back pressure upon the extruder is often higher than in extruders processing fully molten materials. This back pressure is desirable in the case of the CWM process because of the need to achieve a pressure sufficient to activate the binder to form the unique and desirable continuous binder structure.

Both the d.c. motor amperage (torque) and pressure generated within the zone adjacent to the extruder screw's tip are carefully monitored during startup. As powder reaches the extruder die, back pressure is detected and motor torque rises. If all conditions are correct, powder will begin to consolidate. To accelerate the formation of a consolidated structure, a plug can be placed at the exit of the die to force the powder to consolidate. However, great care is required if such action is taken because any applied pressure at the exit of the extruder results in the formation of very high pressure at the extruder screw tip. Once a critical pressure is obtained, the material will densify and achieve an internal viscosity that is essentially infinite. Once such an "auto-densification" process begins, the powder will no longer flow or pass through the die's compression zone. The "lockup" of the powder travels rapidly into the extruder screw as the pressure wave moves backward toward the extruder's feed section. The die design and operating conditions must be adjusted exactingly to obtain a product with the desired final density which, in the case of activated carbon filters, is within the range of 0.57 to 0.65 gm/cm$^3$. However, it is usually possible to maintain density within a narrow ±0.005 gm/cm$^3$ window, once conditions are suitably adjusted. The uniformity of the product is therefore better than that obtained by any other known process.

The operating conditions chosen for extruding a hollow cylinder of activated carbon in a forced point-bonded structure having an outside diameter of 2.40 inches (6.1 cm) and an inside diameter of 0.75 inch (1.9 cm) must meet all of the following criteria:

1. Heating rate must be balanced to obtain complete heating of the carbon during its passage through the die and to consolidate the powder to the core of the extruded profile;

2. Cooling rate in the cooling section of the die must be sufficient to harden the structure prior to its emergence from the die;

3. The compression zone in the compression die serves the purpose of consolidating the exterior surface of the carbon cylinder and provides a uniform, smooth, and low attrition surface to the cylinder. It must be accurately placed along the length of the die at a position that produces the back pressure required to obtain the desired density. In this case, a single compression "pinch" is placed as close to the extruder screw as possible and with a compression of 0.100 inch (0.254 cm) over a length of 1.00 inch (2.54 cm);

4. Preheating of the carbon within the extruder barrel reduces the heating required at the die;

5. Feed rate is limited by the ability of the screw to move the very low density carbon powder without severe deaeration effects—rate of movement of material through the die is, therefore, limited in this case by the efficiency of feed, rather than die back pressure.

The die described here is very simple in design, having smooth walls and posing only a modest requirement for compression. Compression to a smaller diameter becomes progressively more difficult. In addition, manufacture of extruded profiles having cross sections equal to (no compression) or larger than (decompression) that of the extruder screw require more complex die designs and operating conditions. In these cases, the adjustment of die back pressure requires an initial expansion of the powder to a dimension larger than the final extruded shape and then a measured recompression of the powder. However, if this process is not accomplished at the exactly correct distance from the extruder screw, the situation becomes unmanageable and control of part density and back pressure becomes difficult.

The shape that emerges from the extruder follows the tolerances of the tool very closely and, when processing very fine powders, the exterior walls of the part can be very smooth, as defined by the surface of the tool. It is found that the wall of the CWM product consists of particles that are tightly bound to the structure. It is very difficult to remove particles from the outer wall of materials produced by the CWM method at high pressures and these materials generally do not release either particles or fibers except under severe abrasion. Smooth outer walls can be achieved by injecting heat into the structure from the exterior of the die. Walls of the part are smoothest on the side where heat enters the structure. Such smooth and tightly bonded wall structures are not observed as pressure is allowed to drop below the desired CWM range and into the FPB range.

The resulting extrusion is normally composed of a material similar to extremely hard rubber or brittle ceramic and can usually be easily cut to length with a knife or shear, especially if the cutting surface is heated. Extrusions can be produced ranging from structures of many centimeters in diameter to fine hollow fibers having outside diameters of approximately one millimeter. Walls of the extruded part can be as thin as about 100 micrometers and the extrusion process can accommodate sharp angles.

One of the very unusual capabilities of the CWM process, when carried out in an extruder, is its ability to produce a gradient of binder conversion within the extruded product. This appears to be the result of a corresponding gradient of process conditions along the radius of the extrusion. In this direction, there is a transfer of heat generally taking place from the walls of the extrusion tool to the powder mixture. In addition, a substantial gradient of pressure and shear results from the change in the dimensions of the extrusion tool along its length. As the degree of pressure and shear increases along the radius of the extruder, the extent of binder conversion increases. If the outer wall of the extrusion tool remains unchanged in size but the inner size of the tool changes as the result of, for example, the powder slipping over an internal core, the conversion of binder particles along the cylinder's core will be substantially higher than that of the cylinder's exterior. This gradient of conversion can be used to produce, for example, a graded pore density within a structure to be used as a particulate filter and the resulting structure provides a high dirt holding capacity and an ability to effectively remove fine particles with a low pressure drop.

D. Extrusion of Activated Carbons and Porous Metal Tubes

Extrusion, using a generally conventional plastics extruder, of a solid particulate mass is extremely difficult. The rheology of a mixture of solid particles, including a starved phase of binder particles, that undergoes simultaneous changes in applied pressure and temperature is difficult to describe in an analytical simulation. In addition, the apparent viscosity of such a mixture rises to extreme values at high pressures where the primary particles begin to deform and lock together. The binder particles are generally not present in sufficient volume to produce a fluid phase capable of providing substantial slip or lubrication to the primary particles.

For the foregoing reasons, it is necessary to move the particle mixture into the final extruder profile, or shape, quickly and to avoid uncontrolled compression of the particles into what becomes a nearly incompressible immovable mass. Without great care, and without detailed attention to particle mixture formulation and mixing and to design of the extruder and extruder die, a runaway pressure excursion can occur. The mass being extruded can suddenly lock in such a manner, and with such suddenness and speed, that it is possible to destroy the extruder. Extreme care is advised when extruding materials using this process. Any extruder designed for this process should have an extruder barrel with a pressure rating greater than the pressure that can be generated by the extruder drive and screw combination. As an example, it is not unusual to have a pressure excursion over 20,000 psi (1400 kg/cm$^2$) take place in less than 2 seconds if conditions are not maintained within the allowed operating window. The width of the operating window is generally very narrow for slightly compressible materials such as activated carbon powder and exceptionally narrow for materials such as powdered metals.

There are numerous characteristics for each specific powder mixture that play a significant role in the extrusion process described herein. These are: (i) the compressibility of the powder at different applied pressures;

(ii) the extent of wall friction with the extruder die at different pressures, temperatures, and angles of powder flow relative to the extruder wall; (iii) the extent of internal shear required to force the powder to fill the extruder die; (iv) whether the extruded shape has a cross section that is smaller, larger, or equal to the cross section of the extruder screw's flight; (v) whether the extruded profile is a thin or thick section that has high or low strength after emerging from the extruder die; (vi) input heating rate on the extruder die hot section; (vii) temperature within the cooling section of the extruder die; (viii) length of heating and cooling sections of the extruder die; (ix) temperature of extruder barrel zones and any preheating of powder prior to injection into the die; (x) rate of rotation of the screw; (xi) use, if any, of a pusher on the feed hopper to precompress the powder and reduce deaeration within the screw; (xii) whether the die has a stationary or rotating central mandrel; and (xiii) placement of a "pinch" within the die to adjust back pressure and to obtain the desired surface finish upon the extruded shape.

Each of the above variables must be adjusted by the experienced operator to obtain a satisfactory product. At the current time, no analytical method has been developed to guide the exact design of each extruder die and to operate this die with a given powder formulation. Instead, adjustments to process conditions and die dimensions have been found to be required to obtain a system that operates within a small window where back pressure is within a stable and acceptable range while product emerges at the designed uniformity and density. Adjustments to the extruder die can often be as small as 0.010 inch (0.025 cm) to achieve a dramatic adjustment in die back pressure. Operating conditions such as specific temperatures must also be maintained within narrow limits to prevent the locking of the extruded material within the die.

E. Roll Compaction

A wide variety of materials can be produced using the CWM and FPB process carried out with a hot roll compactor. In a typical implementation of this process, the mixture of primary particles or fibers and binder particles is metered using a horizontal screw from a feed hopper to a vertical screw that serves to precompress the powder and to force the powder through the nip zone of a set of heated metal rolls. The powder is generally at a low temperature until it approaches the nip zone, at which time it undergoes rapid heating by the action of the hot rolls. Within the nip zone, the powder undergoes shear, compression, and intense heating and emerges from the rolls as a continuous ribbon, sheet, or slab. Its thickness depends upon the distance between the rolls as set by a shim, by the coefficient of friction of the powder against the roll surfaces, and by the rate of powder feed established by the horizontal screw.

The resulting sheet, if composed of stainless steel particles, can be highly flexible if the metal particles are spherical and the binder resin is present in about 5–8% by weight. A stiff sheet can be produced using fine metallic particles that are not spherical and by using binder resin levels of about 3–5% by weight. When forming stainless steel sheets by roll compaction, additives to the powder mixture are generally not required or desirable. The aim of the process is to produce a reconsolidated sheet, without binder or additives significantly preventing the uniform consolidation of the structure. In addition, additives may adversely influence the properties of the stainless steel sheet once it has been sintered at elevated temperature to remove the binder and to directly diffusion-bond the stainless steel particles.

The sheets of product produced by the CWM and FPB process, as carried out on a hot roll compactor, can be very thin and uniform. Examples given below describe pilot runs of this process that produced sheets of stainless steel powder only 100 micrometers thick (approximately 8 particles wide), uniform and pin-hole free. Sheets only two particles thick can be routinely produced and these have a uniformity that is within a 15% variance as measured by water porometry. Sheets of 10–12 particle thickness are routinely uniform with a 3% variance. Such sheets, each having a different formulation of stainless steel particles, can later be combined to form a graded-density structure comprising multiple layers of stainless steel varying from coarse to fine. Such sheets can be combined on a mildly heated calendering roll into a single thick sheet or slab that can be subsequently sintered to produce a structure with substantially graded pore density and a potentially high dirt capacity when used as a porous filtration medium. During calendering, the sheets can be combined with a wire mesh support to provide structural strength, support, and rigidity.

Thin sheets of CWM immobilized stainless steel can be sintered to produce filtration media. Alternatively, as in the case of most products produced using the CWM process, the binder resin can remain as a functional part of the structure. For example, metallic or carbonaceous particles may be immobilized within thin sheets using a hydrophobic binder particle converted, using the CWM process, into a polymer web or fibers. Such structures, composed of metallic particles immobilized within a matrix of hydrophobic webbing or fibers, can be used as battery electrodes, membranes, or catalytic surfaces.

Highly porous sheets of powdered metals can be produced using the process described herein In some cases, the sheets of powdered metal can be as thin as two particles, such that following sintering in a controlled-atmosphere furnace, one can actually see through the structure when it is held close to the eye. In other cases, the sheets can have pore sizes of less than one micrometer and can be as thin as 100 micrometers. In other cases, the ductility of the sheet may be enhanced through the addition of metal fibers. Because of the physical conditions experienced within a roll compactor, the metal fibers are submerged within the sheet and the surfaces are entirely composed of uniform layers of powdered metal, with the metal wire not visible on the surface of the sheet.

The resulting "green" material may be stacked between layers of ceramic and sintered in a hydrogen furnace at elevated temperature to produce sintered metal sheets. More than one binder may be used to cause a two-step volatilization of binders within the preheating section of the tunnel furnace. In this manner, the binder can be volatilized in stages to prevent too rapid an evolution of binder vapors that can disrupt the structure of the metallic material. In some cases, the thickness of a sheet of roll-compacted powdered metal can be further reduced by the addition of a solid lubricant such as lithium stearate or stearic acid to the powder formulation. However, such additions tend to reduce the strength of the resulting sheet.

Because the sheets of material produced by the CWM and FPB process are produced by the simple passage of a powder mixture through heated rolls, the economics of producing thin and uniform sheets of such materials is very favorable. In addition, such thin sheets utilize a minimum of expensive raw material and have low pressure drop because of their extremely thin and uniform character. Because they are so thin, multiple layers can be combined to form moderately thick sheets that have highly desirable variation in pore size with depth. Examples of roll compaction are provided below. In practice, sheets of thin stainless steel can be produced at rates of about 1.5 feet (46 cm) per second to yield large quantities of such material in a given day of production.

F. Potential Uses of Products

Materials produced by CWM and FPB processing are useful in a wide range of applications, including:

production of molded stainless steel parts that can be processed at high temperatures to form complex porous or nonporous metal parts;

production of filtration structures containing mixtures of binder fibers or webbing and primary fibers or particles and formation of graded pore density structures;

production of sorbent structures such as molded, extruded, or roll compacted forms of powdered and granular activated carbons, silica gel desiccant, activated aluminas, ion-exchange resins, and mixtures of various sorbent particles;

production of porous metallic hollow fibers for membrane supports, metallic flat sheet membrane supports, and other porous metallic structures for casting polymeric membranes, various porous metallic filtration structures and structures useful as spargers, mufflers, or bearings, and other applications requiring porous metallic structures;

production of fibrous structures for filtration applications;

production of fiber and particle composites for use as building materials, e.g. immobilized sand having the physical characteristics of a hard sheet of plastic and suitable for wallboard, or immobilized sawdust reformed into hard and durable structural shapes suitable for construction applications;

production of abrasives that are immobilized as sheets, blocks, and thick structures for use in industrial, household, and commercial sanding and grinding applications, or production of mixtures of metal powder and abrasive particles that are combined and immobilized and then sintered to form metal-bonded abrasives;

production of continuous, seamless porous tubes of mineral or metallic materials for use in irrigation applications, especially drip irrigation; and production of molded and extruded ceramic green bodies using a high-speed process that allows uniform and reliable firing.

Many other applications and potential products can be envisioned using the CWM and FPB technology. Powders and dusts that are often hazardous, such as lithium hydroxide used within breathing circuits, can be immobilized into porous blocks of material that no longer release potentially toxic particles.

The CWM and FPB technology is unique in its speed and versatility. It is often possible to produce immobilized structures in substantially less than one second within almost any matrix. The speed of the process allows high-speed production of thin sheets of immobilized particles or fibers. In addition, the CWM and FPB process has been shown to avoid fouling of sensitive sorbent particles and can be carried out at sufficiently low temperatures to allow the processing of heat-sensitive materials.

VII

EXAMPLES

A wide variety of structures have been produced using compression molding, extrusion, and roll compaction methods. In several cases, formulations have also been developed for injection molding applications. Throughout this specification, all parts and weight percentages are based on the weight of the overall composition and all temperatures are in degrees Celsius, unless otherwise indicated.

A. Compression Molding Stainless Steel Powder

Example 1

A mixture of 95.2% alloy 410 stainless steel (P410L-20) having a mean particle size of 12 micrometers (supplied by Ametek, Powdered Metals Division, Eighty-Four, Pa.) was mixed with 4.8% by weight FE532 ethylene-vinyl acetate (EVA) copolymer (tradename "Microthene", a registered trademark of U.S.I. Chemicals, Inc.). The latter was the binder resin and the former the primary particles. The two powders were combined and carefully mixed by hand to produce a highly uniform mixture. The powder mixture was then placed in a 0.5 inch (1.3 cm) diameter cylindrical compression molding die that had been preheated in a gravity convection oven to a temperature of approximately 210° C. A quantity of the mixture was placed into the mold and quickly compressed to a pressure of 8,000 psi (562.48 kg/cm$^2$). The pellet formed within the mold was ejected immediately and allowed to cool. The resulting pellet was found to have moderate strength and moderate levels of conversion of the binder resin to a continuous form. The compression molding process is generally similar for all powder mixtures when using a given binder resin particle. However, variations in temperature and pressure can be used to produce changes in the extent and character of the continuous binder resin structure formed, the length and diameter of fibers formed when the completed structure is stressed, and the tensile, compressional, and elastic properties of the final product.

This procedure was repeated using a variety of powdered stainless steel materials of alloys 304, 316 and 410 with mesh sizes up to 100 mesh. Molds included a hollow cylinder molding die to produce molded cylinders (short lengths of pipe) having 1.2mm walls and excellent strength as well as molds of other diameters and shapes. The green parts produced from these molds were sintered in a conventional hydrogen furnace to produce porous or full-density materials.

Example 2

A mixture consisting of 90.9% P410L-20 stainless steel powder combined with 9.1% by weight of FE532 EVA was compressed within a compression mold, as described in Example 1, at 8,000 psi (562.48 kg/cm$^2$) and 210° C. The resulting pellet was exceptionally strong and rubbery, had a high tensile strength and the binder resin appeared to be nearly completely converted to a continuous polymer web.

As shown by the following Comparative Examples 3, 4 and 5, binder levels of about 3% or less do not produce satisfactory product.

Comparative Example 3

A mixture consisting of 99% stainless steel powder P410L-20 and 1% FE532 EVA was processed, as described in Example 1, at 8,000 psi (562.48 kg/cm$^2$) and 210° C. The resulting pellet was soft and friable and crumbled easily.

Comparative Example 4

A mixture consisting of 98% stainless steel powder P410L-20 and 2% FE532 EVA was processed, as described in Example 1, at 8,000 psi (562.48 kg/cm$^2$) and 210° C. The resulting pellet was soft and friable and crumbled easily.

Comparative Example 5

A mixture consisting of 97% stainless steel powder P410L-20 and 3% FE532 EVA was processed, as described in Example 1, at 8,000 psi (562.48 kg/cm$^2$) and 210° C. The resulting pellet was soft and friable and crumbled easily.

Example 6

A mixture was formulated consisting of 89.4% by weight P410L-20, 3.6% by weight FE532, and 7% by weight polyethylene glycol 600 MW (PEG 600). The resulting pellets produced, as described in Example 1, at 8,000 psi (562.48 kg/cm$^2$) and 210° C. contained continuous polymeric structure but lacked substantial strength.

Example 7

A mixture was formulated consisting of 86.5% by weight P410L-20 mixed with 6.5% by weight FE532 and 7% by weight PEG 600. The resulting pellets produced, as described in Example 1, at 8,000 psi (562.48 kg/cm$^2$) and 210° C. contained substantially continuous polymeric structure and were exceedingly strong and rubbery.

Example 8

A mixture was formulated consisting of 84.5% P410L-20 mixed with 6.4% FE532 and 9.1% PEG 600 by weight of polyethylene glycol 600 MW. The resulting pellets produced, as described in Example 1, at 8,000 psi (562 48 kg/cm$^2$) and 210° C. were highly converted to a continuous structure, very strong and rubbery, and flowed through a small orifice in a manner making them suitable for use in injection molding applications.

Example 9

A mixture was formulated consisting of 82.7% P410L-20, 6.25% FE532, and 11.1% PEG 600. The resulting pellets produced, as described in Example 1, at 8,000 psi (562.48 kg/cm$^2$) and 210° C. were converted to a continuous form, very strong and rubbery, and flowed easily through a small orifice in a manner making them very suitable for use in injection molding applications.

Example 10

A mixture was formulated consisting of 91.2% P410L-20, 1.8% FE532, and 7% PEG 600. The resulting pellets produced, as described in Example 1, at 8,000 psi (562.48 kg/cm$^2$) and 210° C. contained continuous polymeric structure but were not strong.

Example 11

Pellets produced in Example 2 were impregnated with a variety of fragrances formulated in alcohol and water-based solvents (e.g. CHLOÉ perfume, ARAMIS men's cologne, AZZORO men's cologne and the like). The resulting pellets were left in the open air for several weeks and retained potent fragrance for an extended period of time. This demonstrates that the microporous character of the pellets permits them to be potentially used for the slow release of volatile fragrances, insecticides, pheromones, pharmaceuticals, and other materials.

Example 12

Pellets produced in Example 1 were sintered in a vacuum oven and examined. Dimensions of the pellets (diameter and height) were reduced by 8% and the metallurgical properties were acceptable.

B. Compression Molding Silica Gels

Example 13

Mixtures were made from granular silica gel (#2509 Sigma Chemical Company), combined with 8% FE532 EVA, both with and without 15% by weight of P410L-20 stainless steel serving as a processing aid (to provide improved heat transfer into the mixture). The resulting mixtures were loaded into a 0.5 inch (1.3 cm) diameter die and processed at 8,000 psi (562.48 kg/cm$^2$) pressure and 210° C. In both cases, the resulting material was crumbly and did not form a strong, high tensile strength, structure. Increasing the binder content to 8.8% resulted in a stronger, rubbery material, with a moderate degree of conversion to a continuous polymeric structure.

Example 14

Mixtures were made from granular silica gel (#4883, Sigma Chemical Company) combined with 8% by weight of FE532 EVA, 15% by weight P410L-20 stainless steel powder, and a trace (approximately 0.5%) of Cab-O-Sil fumed silica. The resulting pellet was formed, as described in Example 13, at 8,000 psi (562.48 kg/cm$^2$) pressure and 210° C. to yield a strong and rubbery product with a continuous polymeric structure that was readily converted by applied stress into small fibers. Pellets produced using this formulation and process conditions were placed in an oven at 210° C. for a period of 30 minutes. Pellets removed from the oven had entirely lost their tensile strength, had changed from a light grey to a brown color, had a mild odor, and showed no continuous structure when examined under a microscope and yielded no fibers when stressed.

Example 15

A mixture was made from granular silica gel #4883 combined with 8% by weight of FN500 polyethylene binder powder, and 15% by weight of P410L-20 stainless steel powder. It was formed at 8,000 psi (562.48 kg/cm$^2$) pressure and 210° C., as described in Example 13. The resulting formation was brittle and sticky while hot and difficult to release from the mold. Omission of the stainless steel resulted in a product having a continuous binder resin structure, a rubbery character, long sinuous fibers produced by stress, excellent strength, and good mold release character.

Example 16

A mixture was made from #4883 silica gel combined with 9.3% polyethylene oxide (Union Carbide, Polyox WSR grade, 5,000,000 MW) and processed, as described in Example 13, at 210° C. and 8,000 psi (562.48 kg/cm$^2$) in the standard 0.5 inch (1.3 cm) diameter compression mold. Pellets resembled soft sandstone and easily crumbled. A second mixture containing 16.8% polyethylene oxide demonstrated similar characteristics. The material was only slightly converted to continuous form and the pellets rapidly disintegrated in deionized water. Pellets produced from a mixture of silica gel and 23% polyethylene oxide at a temperature of 230° C. and maximum pressure of approximately 10,000 psi (703.1 kg/cm$^2$) demonstrated substantial conversion to continuous form, with a mixture of both large and small fibers produced by an applied stress. The pellet was very strong and stiff.

C. Immobilized Ion-Exchange Resins

Example 17

A series of tests were conducted with a mixture of 20% by weight P410L-20 stainless steel, 10% FE532 EVA binder resin, and the remainder of the mixture composed of IRA-64 powdered styrene-divinylbenzene ion-exchange resin. The components were carefully mixed in bulk using a modified ball mill consisting of a 5 gallon plastic carboy having two sets of threaded stainless steel rods installed along its length and filled with several pounds of cylindrical carborundum grinding balls approximately 1 inch (2.5 cm) in diameter and 1 inch (2.5 cm) in height. This modified mixer was found to produce a unique effect wherein the impact of the grinding media upon the threaded rods produced a high-shear mixing of the powdered ingredients and resulted in rapid deagglomeration of the binder resin. Without the steel rods, the ball mill had little impact upon the binder resin and dispersion of the binder aggregates was not achieved.

The resulting mixture consisted of powdery materials that were a major dust problem when first added to the mixer. However, when combined and mixed through the action of the special grinding mill described above, the resulting mixture had a substantially reduced dusting character and could be handled more easily.

A series of pellets was produced using this mixture to assess the influence of temperature upon the CWM process. Pellets were produced at preheating temperatures of 200° C., 190° C., 185° C., and 175° C. All of these temperatures are well above the 110° C. melting point of the FE532 EVA binder resin and well above the temperatures previously recommended in the prior art for the binding of particles.

Tests carried out using the 0.5 inch (1.3 cm) diameter compression molding die and 8,000 psi (562.48 kg/cm$^2$ applied pressure demonstrated that pellets produced at 200° C. contained a high density of continuous polymeric web. Pellets produced at 190° C. showed reduced strength but continued to demonstrate substantial volumes of continuous binder resin material. Pellets produced at 185° had substantially reduced strength and a low density of continuous material. At 170° C., the pellets formed immediately crumbled and there was no evidence of a continuous polymeric structure. It is clear that temperatures well above the melting point of the binder resin are required to accomplish the CWM process and produce the desired continuous binder resin structure. Such temperatures are well above those previously used by other researchers, as are the pressures used during the CWM process.

Example 18

A mixture was made of CG-400 styrene-divinyl-benzene ion-exchange resin with quaternary ammonium functionality (Rohm & Haas Co., Philadelphia, Pa.), which was composed of a fine powder of 100–400 mesh particles with 17% by weight FE532 EVA binder resin. Pellets were produced, as described in Example 17, at 8,000 psi (562.48 kg/cm$^2$) and 210° C. The pellets were rubbery and the binder was converted to a continuous phase throughout the pellet.

A test was carried out on a formulated powder composed of 8% by weight FE532 EVA, 15% by weight P410L-20 stainless steel powder, and the remainder composed of CG-400 ion-exchange resin. Pellets were produced, as described in Example 17, by compression molding at 8,000 psi (562.48 kg/cm$^2$) and at various temperatures to assess the potential for forming the continuous structure at low temperatures.

At 195° C., the pellets produced from the above formulation were strong and rigid with the binder highly converted to the continuous form and stable when immersed in water. At 170° C., the pellets were rubbery but of lower tensile strength and substantially less converted. At 155° C., the pellets were weak and crumbled easily and no continuous structure was observable. Attempts to form pellets at 135° C. resulted in a powder without cohesion. The powder mixture fell out of the mold in completely unconsolidated form after compression at pressures up to 8,000 psi (562.48 kg/cm$^2$). This demonstrated that, while the binder melts at a temperature below 135° C., the CWM process requires temperatures well above the melting point of the binder resin, although those temperatures may vary depending on the formulations employed.

A formulation consisting of 15% FE532 EVA, 8% P410L-20 stainless steel, and the remainder composed of CG-400 ion-exchange resin was processed at different pre-heating temperatures and, as described in Example 17, at 8,000 psi (562.48 kg/cm$^2$) in the 0.5 inch (1.3 cm) diameter compression molding die. The results were acceptable levels of conversion at 180° C. and a total lack of conversion at 155° C. At the latter temperature, the powder completely failed to consolidate.

Example 19

A sample of Dowex 50WX8 styrene-divinylbenzene ion-exchange resin with sulfonic acid functionality having a particle size between 200 to 400 mesh (Dow Chemical, Midland, Michigan) was dried for one hour at 80° C. and then mixed with 17% by weight FE532 EVA binder. The resulting mixture was processed, as described in Example 17, using the 0.5 inch (1.3 cm) diameter compression molding die at 8,000 psi (562.48 kg/cm$^2$) pressure (562.48 kg/cm$^2$) and 210° C. preheating, to produce a pellet that was substantially converted and had a hard rubber consistency.

Example 20

A second mixture was made consisting of 8.8% FE532 EVA binder resin, 8.8% P410L-20 stainless steel powder, and the remainder 50WX8 ion-exchange resin. Pellets were produced, as described in Example 17, at 8,000 psi (562.48 kg/cm$^2$) and 210° C. preheating, that were extremely strong and highly converted. Increasing the stainless steel content of this formulation to 15% by weight further increased the degree of conversion and strength of the resulting pellet.

Example 21

A mixture of IRP-64 powdered macro reticulate styrene-divinylbenzene ion-exchange resin with carboxylic acid functionality with 8% by weight FE532 EVA binder resin and 12% SW-10 chopped cellulose fibers (Manville Sales Corporation, Denver, Col.) was processed, as described in Example 17, at 210° C. preheat and 8,000 psi (562.48 kg/cm$^2$) pressure in the 0.5 inch (1.3 cm) diameter compression molding die. The resulting pellets were very strong but, when immersed in water they slowly swelled, experienced a loss of tensile strength, and eventually cracked and broke.

A second formulation consisting of 8% by weight FE532 EVA and 17.5% SW-10 cellulose fibers, and the remainder composed of IRP-64 powdered ion exchange resin, processed, as described in Example 17, at 210° C. preheating and 8,000 psi (562.48 kg/cm$^2$) pressure, provided a series of pellets that were significantly stronger, remained intact, and retained their tensile strength when immersed in deionized water for extended periods of time.

Example 22

IRA-64 powdered ion-exchange resin was combined with 10% chopped acrylic fibers and 10% FE532 EVA binder resin and processed, as described in Example 17, at 8,000 psi (562.48 kg/cm$^2$) and 210° C. to produce extremely strong pellets that were stable when immersed in deionized water for extended periods. Acrylic fibers are considered a better supporting fiber than cellulose because of reduced swelling of the structure. These pellets were highly porous and appeared to be an acceptable combination ion-exchange and filtration medium.

D. Molded Diatomaceous Earth Formulations

Example 23

Samples of very fine to coarse grades of diatomaceous earth were obtained from the Manville Sales Corporation, (Fibers and Minerals Division, Denver, Colo.). These included Celite types 500, 501, 512, 545, and 577. pellets produced, as described in Example 17, at 210° C. and 8,000 psi (562.48 kg/cm$^2$) in the 0.5 inch (1.3 cm) diameter compression mold die demonstrated only limited strength when formulated as direct mixtures of diatomaceous earth and FE532 EVA at concentrations up to 40% by weight. The major cause of the limited success of these formulations appeared to be incomplete dispersal of the binder resin into the diatomaceous earth.

An extended series of tests were carried out with Celite 512 mixed with FE532 EVA binder resin in a container vigorously agitated with carborundum grinding balls. Formulations were amended with increasing amounts of Cab-O-Sil fumed silica. A formulation of Celite 512 containing 25% FE532 EVA and % fumed silica was found to have extreme strength, a high degree of conversion, and good wet strength.

A coarse grade of diatomaceous earth, Celite 545, was mixed with increasing amounts of FE532 EVA binder and fumed silica. A formulation of this material with 8% FE532 EVA and 4% fumed silica, processed, as described in Example 17, at 8,000 psi (562.48 kg/cm$^2$) and 210° C., was shown to have the desired physical properties of strength, rigidity, and wet strength. The coarse grade of Celite required substantially less binder resin to form a successful formulation.

Example 24

Celite 545 was combined with 10% by weight chopped acrylic fibers (provided by Cuno, Incorporated, Meriden, Conn.) and 10% by weight of FE532 EVA binder resin powder. The mixture was processed for three minutes through a high-intensity dry mincing mill to produce a fibrous mass with an attached powdered material. Although the components did not appear highly uniform when processed in this manner, they could be processed, as described in Example 17, at 210° C. and 8,000 psi (562.48 kg/cm$^2$) pressure in the standard 0.5 inch (1.3 cm) compression molding die to produce pellets of extremely high strength. The pellets were highly porous and retained their strength even when immersed in deionized water for periods of several weeks. Very thin structures could be produced from this formulation and a thin, flat sheet of the material appears to be an excellent filtration medium. The acrylic fibers have been found to experience only minimal swelling in water and produce a more stable filtration medium than media based upon cellulose fibers. In addition, the acrylic fiber is a low-cost and convenient source of industrial grade fiber suitable for filtration applications. The above formulation produces a medium capable of providing estimated filtration ratings down to 1 micrometer when produced in wall thicknesses of 1 mm.

E. Abrasive Structures

Example 25

A mixture of fine glass beads of 100–170 mesh was combined with 20% by weight FE532 EV binder resin and processed, as described in Example 17, at 210° C. and 8,000 psi (562.48 kg/cm$^2$) to produce an extremely tough and rubbery abrasive structure that was effective in sanding trials on wood, acrylic, and aluminum metal. A similar mixture containing 10% FE532 EV binder resin was also an effective abrasive structure but displayed somewhat lower strength. Both were rated as acceptable fine abrasive structures that could be laminated to a polyester sheet and mounted in an orbital sander. The structures slowly erode during use to reveal underlying layers of additional abrasive. Accordingly, their operating life is quite long. In addition, the flexible structure vibrates within an orbital sander to displace accumulated cuttings. These move to the edge of the pad, where they are ejected. Additional formulations L demonstrated that 10–20% of FE532 EVA produced acceptable abrasive systems. However, a higher melting point binder resin would be desirable in a commercial product. In addition, additives such as fumed silica have the potential of permitting reductions in the amount of binder resin required, while producing a somewhat less rubbery material with improved attrition resistance.

Example 26

Abrasive structures were produced from mixtures of 40% coarse abrasive (silicon carbide), 40% spherical glass beads, 10% FE532 EVA binder resin, 10% SW-10 cellulose fibers, and 1% Cab-0-Sil fumed silica. Process conditions were 210° C. at 8,000 psi (562.48 kg/cm$^2$) pressure in the 0.5 inch (1.3 cm) diameter compression molding die, as described in Example 17. Formulations lacking fumed silica showed a poor dispersion of the binder resin and extremely poor conversion. The resulting abrasive structures were capable of rapidly polishing hardened steel and demonstrated excellent performance during rust and scale removal tests. Performance was approximately equal to that provided by coarse conventional sandpaper.

F. Composites Containing Polymeric Ion-Absorbent Resin

Example 27

Two samples of a polymeric engineering thermoplastic resin having an unknown composition and identified as a "polyketone" were provided by Shell Chemical Company, Houston, Tex. One sample, identified as 15917-142-000, consisted of a very fine powder, while the second sample, identified as 15917-142-023, consisted of a fine granular material. It was desired to produce a structure from these samples that would be substantially microporous. Preliminary evidence was reported to have demonstrated that such powders have the ability to complex with ions and to remove the ions from water. Because the complexation reaction is not a conventional ion-exchange process, but instead involves the capture of the ion on a non-charged base polymer, both the ion that is directly complexed and its counter-ion are captured to maintain charge neutrality. In other words, the single resin carries out both cation and anion removal.

In addition, the complexation reaction is energetically less favored than the stronger ion-exchange reaction. Accordingly, the complexation of the captured ions is expected to be substantially influenced by a change in temperature. Adsorption is highly effective at room temperature but there is a substantial desorption of the adsorbed ions at elevated temperature. Such a material can be used in an ion-exchange temperature-swing adsorption (TSA) cycle to accomplish continuous deionization of process water. In fact, because desorption of the captured ions is accomplished by the passage of heated water through the spent resin, the potential economics of the process can be substantially better than that achievable using conventional ion-exchange resins and acid and base desorption cycles.

The problem with the current polyketone resin is that it is available only as fine powders or fine granular materials having a size too fine to use in a conventional deep axial-flow water purification system. The polymer is also non-porous and carries out the complexation reaction only on the surface of the resin rather than within micro- and meso-pores within the resin particles. Accordingly, finely divided resin powder is strongly preferred for an ion-complexation process application. In addition, a means to form the powder into uniform and relatively thin structures is required to accomplish the ion-complexation process in a manner having a reasonably low pressure drop. A microporous structure containing the proposed complexation resin is therefore required.

The 15917-142-000 powder was mixed in a high-intensity dry mincing mixer for three minutes With 10% by weight chopped acrylic fiber and 10% by weight FE532 EVA binder resin. The resulting material was reasonably uniform and when processed as described in Example 17, at 210° C. and 8,000 psi (562.48 kg/cm$^2$) pressure, produced a pellet that was strong and porous and retained its integrity when immersed in water for extended periods.

An identical formulation based upon the polyketone granular material 15917-142-023 and processed under identical conditions resulted in pellets that were exceptionally strong and porous and remained fully intact in deionized water for several weeks. Both samples of the polyketone could thereby be incorporated into a composite of fibers to provide a medium that appears suitable for the production of ion-adsorption cartridges.

Example 28

Polyketone plastic resin 15917-142-023 Was mixed with 10% by weight P410L-20 stainless steel powder and 10% FE532 EVA binder resin and processed, as described in Example 17, at 210° C. and 8,000 psi (562.48 kg/cm$^2$) pressure to produce strong, porous pellets that were stable when immersed in deionized water for extended periods. Processing of 15917-142-023 alone at these conditions resulted in pellets lacking cohesion or strength that immediately crumbled. Processing of 15917-142-023 with 5% FE532 EVA binder resin under the same conditions also produced a weak pellet with insufficient strength. Subsequent trials of a formulation of 15917-142-023 containing 10% P410L-20 stainless steel powder, 10% FE532 EVA binder resin and 10% 15917-142-000 powdered polyketone plastic showed that such pellets could incorporate significant amounts of the extremely fine powder without a serious loss of strength, although porosity is presumed to be substantially reduced.

G. Immobilization of Activated Carbon

Example 29

A sample of 12×30 mesh activated carbon based on coconut shell (Westates Carbon) was mixed with 5% FE532 EVA binder resin and processed, as described in Example 17, at 210° C. (30 second preheating) and 1500 psi (105.47 kg/cm$^2$) pressure applied to the 0.5 inch (1.3 cm) diameter compression molding die. The resulting structure was a cohesive material with moderate tensile strength and substantial compressional strength. A second sample of this formulated mixture was processed in a 1 inch (2.5 cm) diameter compression molding die at 2000 psi (140.62 kg/cm$^2$) pressure and 210° C. (30–60 seconds preheating). The resulting material was similar in character to that produced at similar conditions in the smaller die. This formulation can be of value for air filtration applications for the production of respiratory filter cartridges or for large plate and frame filtration applications. This material was deemed suitable for producing large molded structures. The resulting material showed only occasional areas of continuous polymer and then only at the points of contact between the relatively large grains of activated carbon. The remainder of the binder resin appeared to remain on the surface of the carbon.

Using a large 12 in.×12 in.×1 in. (30.5 cm×30.5 cm×2.5 cm) deep mold, large slabs of 12×30 mesh BPL (bituminous) carbon (Calgon Corporation, Pittsburgh, Pa.) were produced using 1000 psi applied pressure. Such large slabs were formed into light sheet metal frames that served as filter cartridges.

Example 30

A sample of 20×50 mesh bituminous coal-based activated carbon was mixed with 5% FE532 EVA binder resin and the resulting mixture was processed, as described in Example 17, at 2000 psi (140.62 kg/cm$^2$) pressure with 60 second preheating at 210° C. in the 1 inch (2.54 cm) diameter compression molding die. The resulting material was substantially stronger than that produced in Example 29 and appeared to be suitable for liquid filtration applications. This mixture was deemed suitable for producing large molded or extruded structures. The resulting material showed continuous structure only at the points of contact between the relatively large grains of activated carbon. The remainder of the binder resin appeared to remain on the surface of the carbon as powder.

Example 31

A series of molded activated carbon structures was produced using a set of dies having different cross sections, including 2 inch (5.1 cm) diameter solid cylinders and hollow cylinders having 2.5 inch (6.4 cm) O.D. and 1 inch (2.5 cm) I.D. Larger structures up to seven inches in height were molded within these dies using approximately 2,000 psi (140.62 kg/cm$^2$) pressure and a temperature of 210° C. The procedure involved preheating the die and loading a mixture of activated carbon particles (20×50 or 80–325 mesh for liquid service) containing 5% to 9% by weight FE532 EVA binder resin dispersed by careful high-intensity mixing. The resulting molded structures were strong but displayed only limited or no continuous structure of the binder resin. However, the structures were of value and could be operated in aqueous service as adsorbent filters for extended periods of time.

Example 32

An activated carbon right circular cylinder having dimensions of 2.40 inch (6.1 cm) O.D. and 0.75 inch (1.9 cm) I.D. was extruded using a custom built extruder with a 2.500 inch (6.4 cm) screw with an L:D ratio of 10:1. The barrel was designed to have a burst pressure of over 40,000 psi (2800 kg/cm$^2$) and an operating pressure of 20,000 psi (1400 kg/cm$^2$). The screw was driven by a special high-torque, low speed gear reducer connected to a 20 H.P. D.C. motor. The barrel was designed with three heating/cooling zones. The first was a conventional feed section where powder was picked up by the screw. The second and third zones were composed of helical grooves within the heavy barrel with coolant flowing through the grooves. Conventional heat transfer systems were deemed insufficient to move heat into and out of the barrel because of its thick walls. The barrel terminated without provision for a breaker plate and with the screw tip flush to the end of the barrel.

To extrude a cylinder of activated carbon powder having a hollow core, a screw with a conventional auger flight design and with 0.650 inch (1.65 cm) height of flight was used. The screw was cored to allow cooling or heating and the tip was finished with a hole tapped to accept a 0.75 inch (1.9 cm), 32 TpI (12.6 turns/cm) left hand thread to allow the use of a screw extension. The screw was designed to shear at 21,000 psi (1500 kg/cm$^2$) to prevent destruction of the extruder in the event of a pressure excursion.

A die was manufactured having a 1.000 inch (2.54 cm) thick flange that interfaced to the face of the extruder barrel, using six heavy bolts. The flange was fitted with a central hole matching the 2.500 inch (6.35 cm) diameter of the extruder screw and smoothly blended over its thickness to a 2.40 inch (6.1 cm) diameter. That portion of the flange having the 2.40 inch diameter was aligned and welded to a heavily built 18 inches (45.7 cm) long tube having an I.D. of 2.40 inches (6.1 cm) and an O.D. of 4.00 inches (10 16 cm). The interior of the tube was carefully honed to be exceptionally smooth and to minimize wall friction. The first 10 inches (25.4 cm) of the tube adjacent to the flange was fitted with band heaters whose heating rate was controlled by a variable transformer. The final 6.00 inches (15 cm) was undercut by 0.25 inch (0.64 cm) and fitted with a metal cap to provide a cavity through which coolant could be circulated. The temperature of the coolant could be controlled using a thermoregulated coolant circulation system.

A screw extension was provided consisting of a 0.750 inch (1.9 cm) diameter drill rod having a 32 TPI left hand thread that fit the tapped hole of the screw. The screw extension was undercut to cause the screw extension to shear in the event of a pressure excursion and to prevent severe stripping of the screw's threads. The screw extension was 24 inches (61 cm) and, when installed, extended approximately 5 inches (13 cm) out of the die.

This die is called a "compression die" because the cross section of the extruded part is smaller than the cross section of the extruder's screw. The compression of the material in this case occurs as a single step within the flange of the die and as close as possible to the screw tip. In operation, the feed section of the extruder was maintained at approximately 50° F. (10° C.), zone 1 at 120° F. (49° C.), and zone 2 at 180° F. (82° C.). The screw was maintained at the same temperature as the feed section. Screw rotation was set at 4 RPM. The input power to the heated section of the die was maintained at approximately 2 KW. The temperature of the cooled section of the die was maintained at 120° F. (49° C.).

Activated carbon powder composed of TOG grade (Calgon Carbon, Pittsburgh, Pa.) 80 to 325 mesh was mixed with sufficient binder resin (510 grade polyethylene, U.S.I. Chemical) to provide 15% by weight of binder. The activated carbon was reasonably dry in order to prevent steam formation. The powders were mixed in a plow mixer for several hours until a stable aggregated mixture was obtained. The powder was then fed into the extruder following a one hour preheating period for the extruder. The desired activated carbon cylinder was successfully extruded.

H. Roll Compaction of Stainless Steel Powders

Example 33

A total of 40 pounds (18 kg) of P410L-20 stainless steel was mixed with sufficient FE532 EVA binder resin to provide a total of 5% resin by weight. The resulting mixture was processed in the high intensity modified ball mill previously described to produce a highly uniform mixture. This material was processed on a Fitzpatrick Roll Compactor (Chicago, Ill.) having a set of 8 inch (20.3 cm) diameter and 2 inch (5.1 cm) wide compaction rolls and modified for operation at substantially elevated temperatures. Such modifications included the production and installation of PTFE roll seals, the installation of hot air heaters that directed heated air onto the rollers of the compactor, and a series of knives for stripping the sheet of immobilized material from the rolls.

The rolls were heated using air of approximately 300°-350° C. which was directed against the flat stainless steel rolls operating at 6-8 RPM. A shim was placed between the roll supports to provide a separation between the rollers of approximately 200 micrometers. The pressure upon the rolls are adjusted to maintain an estimated 10,000-20,000 psi (703.1-1406.2 kg/cm$^2$) at the roll face. The system included a horizontal screw for metering the flow of powder to a vertical screw that provided precompaction and deaeration of the powder and directly forced the powder through the nip zone of the compactor. A hot but consolidated sheet of immobilized stainless steel emerged from the rolls and cooled within 3-4 feet (61-91 cm) of travel from the rolls. Once cooled, the sheet could be handled without serious concern for deformation.

The production, when processed at an estimated 10,000 psi (703.1 kg/cm$^2$) at the roll interface, was a sheet approximately 200-250 micrometers thick, having an extremely uniform porous structure when examined under electron and optical microscopy. It contained a high density of continuous polymeric material, as demonstrated by examination of a torn edge. The sheet was stiff and brittle and underwent stress cracking when repeatedly bent to substantial angles. However, the sheet could be easily handled and could be elastically bent to substantial angles. The resulting sheet did not release particles of metal, even when vigorously rubbed on a white sheet of paper. The estimated particle removal rating of the stainless steel sheet, if used as a particulate filter, is approximately one micrometer nominal.

Example 34

A second sample of the mixture of Example 33 was processed under essentially identical conditions but under approximately 20,000 psi (1406.2 kg/cm$^2$) pressure at the roll interface. This sheet was approximately 100-120 micrometers thick and very flexible but remained susceptible to stress cracking on repeated bending. The material was highly uniform and microporous, with a high density array of particles and with an average sheet thickness equal to 12 particles. This extremely thin structure was deemed to be suitable for use as one of the several layers in a multilayer, graded pore density medium, consisting of individual sheets of fine and coarse particles configured to provide pore size gradient with depth in the medium and to allow improved dirt holding capacity.

Example 35

A sample of the formulation of Example 34 was also compression molded into a pellet, as described in Example 17, at 210° C. and 8,000 psi (562.48 kg/cm$^2$) pressure and sintered at 1100° C. (vacuum furnace with low pressure nitrogen atmosphere) for 30 minutes together with sample sheets of the material produced on the roll compactor. The results were metallic sheets and pellets that underwent approximately 12% shrinkage in linear dimensions following the sintering process. The pellets were tightly consolidated. The flat sheets heated very quickly and it was necessary to heat them slowly up to approximately 600° C. to avoid the formation of bubbles while the binder was removed. High applied pressure during production causes the metallic structure to remain stable when the binder has been removed. The resulting sintered material retained the shape and integrity of the original molded or roll-formed material.

Example 36

Another roll-compacted stainless steel product was produced from 410 alloy stainless steel provided by the Hoeganaes Company, and consisted of particles passing through a 325 mesh. This was combined with 8% by weight FE532 EVA binder resin using the operating conditions given in Example 33 and a 10,000 psi (703.1 kg/cm$^2$) pressure between the rolls. Under these conditions, the resulting sheet was approximately 200-250 micrometers thick, extremely rubbery and very flexible and free of stress cracking, even when folded repeatedly. Greater care must be used when sintering these flexible sheets to avoid the rapid evolution of gases as a result of the removal of binder resin. The advantage of this formulation was its ability to be freely bent and worked like flexible paper without fear of embrittlement or fracture. Sheets having a thickness of 250 micrometers can be easily produced and these offer an excellent filtration medium and support layer for sheets of the finer stainless steel powders.

Complex stainless steel structures may be produced by combining several metal sheets, produced as in the foregoing examples, and having immobilized stainless steel particles of different diameters By combining a series of coarse and fine stainless steel structures, the coarse materials serve as pre-filtration structures to the underlying very fine stainless steel filtration structure. This substantially increases the dirt life of the filter medium.

One convenient method for producing such structures is to combine the various sheets on a mildly heated calendering roll. It is also possible to combine the thin sheets of stainless steel formed by the CWM process with metallic mesh supports. These can also be combined using a calendering roll. Several sheets of various grades of stainless steel can also be simultaneously combined with a supporting metal mesh to provide a complex structure at low cost and without complex equipment or techniques. In addition, the procedure permits an enormous range of formulated graded pore size filter media to be produced from a limited series of sheets of specific stainless steel materials.

I. Production of Porous Graphite Sheets

Example 37

Very thin, 0.002 to 0.012 inch (0.005-0.030 cm) foils of graphite were produced by roll compacting a mixture of graphite (8 micron average particle diameter, W. R. Grace & Co.) with 12% by weight 510 polyethylene binder. These powders were mixed in a high intensity ball mill as previously described. The resulting mixture was processed in a roll compactor having 6 inch (15 cm) diameter and 6 inch wide smooth rolls. The pressure applied between the rolls was generated by 2400 psi (170 kg/cm$^2$) hydraulic pressure on a 5 inch (13 cm) hydraulic cylinder. Temperature of the rolls was 120°-150° C. Under these conditions, a continuous sheet of graphite-loaded film was produced having approximately 29% porosity and having pores generally smaller than 1 micron. The resulting film can be handled but is not very strong when produced in thicknesses less than 0.005 inch (0.013 cm). This indicates that materials having structures similar to graphite can be incorporated into very thin and highly uniform porous sheets using this process.

J. Production of Composite Particles

Example 38

Consolidated mixtures of normally incompatible powders can be made using the CWM technology and, once these powders have been immobilized within a stable matrix, the material can be granulated to produce composite particles. For example, a mixture of 20% by weight P410L-20 powder, 10% by weight FE532 EVA binder resin, and 70% by weight IRA-64 ion-exchange resin powder (Rohm & Haas Company, Philadelphia, Pa.) were mixed in a high intensity modified ball mill to yield a uniform mixture of powders that demonstrated no tendency to separate into high and low density fractions. It has been found that, although the steel particles are nearly seven times more dense than the ion-exchange powder, the binder particles maintain the stability of the mixture. While the original pure powders are very dusty, the dust problem is essentially eliminated when they are mixed. The resulting powder mixture also pours easily.

The formulated mixture of powders was processed by roll compaction using 10,000 psi (703.1 kg/cm$^2$) pressure at the roll interface and a high roll temperature produced using hot air. The resulting product was a uniform sheet of material approximately 300 micrometers thick that retained both the ion-exchange properties of the IRA-64 resin and the ferromagnetic properties of the 410 series stainless steel powder. This material ca be further processed through a conventional granulator to chop the thin sheet of material into a granular material. The granular material is suitable for use as a ferromagnetic ion-exchange resin that can be utilized in specialized chromatography systems for the separation of chemicals and biochemicals. If desired, the granulated product particles can be made spherical using various methods such as marumerizing.

Other uses of this invention will readily suggest themselves to those skilled in the art. For example, the method of the invention could be adapted to insert molding. In one such application, a metal shaft could be placed in a mold and an abrasive pad formed around it. The pad could be impregnated with a polishing lubricant, which is absorbed into the porous matrix.

In another variation, massive parts can be heated to the required CWM temperature only a limited distance into the outer surface. Application of pressure and shear then converts the binder only adjacent the surface of the object. This results in something akin to "case hardening" with a soft, unconsolidated core. This has been used in the production of large blocks of immobilized carbon.

K. Forced Point-Bonding

The following examples illustrate the aspect of this invention in which forced point-bonded products are obtained under the conditions utilized in the CWM process.

Example 39

Powdered activated carbon (Calgon Corporation) having a mesh size of 80 to 325 mesh wa ball milled with 7.5% by weight of FE532 EVA binder to produce a uniform mixture that was molded at a pressure of 1000 psi (70.31 kg/cm$^2$) and a temperature of 210° C. Structures 2.875 in. (7.30 cm) in diameter, having a 0.50 in. (1.27 cm) hollow core, and as deep as 8.00 in. (20.32 cm) were molded in cylindrical cavities without difficulty and the resulting hollow cylinders of immobilized powdered carbon were uniform, strong, and retained their desired adsorption capacity. The applied pressure in this case is generally below the optimum required for substantial production of a continuous polymeric phase.

Examination under a microscope confirms that the production of a continuous polymeric phase within this mixture, at this pressure, was very limited and the bonding of the individual particles appears to be the result of strong forced point-bonding. The lower pressure applied for the formation of molded activated carbon is desirable when handling this more fragile material. Use of temperatures outside of those required for the CWM process resulted in a complete loss of bonding. One can cause forced point-bonding of certain structures using pressures in the lower range required for the formation of the usual continuous binder resin phase if the applied temperature and shear are maintained within the range specified for the CWM process. The use of this high temperature and lower pressure forced point-bonded process is acceptable for particles that have substantially softer or weaker structures and where significant crushing of these particles may result when using the pressures found optimal for the CWM process.

Example 40

Tests similar to that described in Example 39 above for forced point-bonding of powdered activated carbon were repeated using granular activated carbons. Various grades of activated carbons, including 12 to 30 and 20 to 50 mesh granular materials from bituminous coal (Calgon Corporation) and coconut-shell origins (Westates Corporation) were tested to produce FPB structures. In all cases, the use of FE532 EVA binder required a sequence of preheating followed by application of intense shear and pressure to achieve bonding. Temperatures required were typical of CWM processing (190° to 210° C.) but applied pressures as low as 1000 psi (70.31 kg/cm$^2$) were capable of providing suitable force point bonding.

Bonding of powdered (80 to 325 mesh) activated carbon is generally not possible under the process conditions proposed by Degen and Gsell in the aforementioned U.S. Pat. No. 4,664,683 and they disclose only coarse grades of activated carbons. Their applied temperatures, pressures, sequence of process steps and degree of applied shear at full temperature are entirely outside those used in this invention. In addition, this invention allows relatively large and deep structures to be freely molded at high speed while this would be impossible in the Degen et al. method. The speed of the forced point-bonding embodiment of the process is essentially the same as that of the CWM process, allowing processing of a sample within seconds or fractions of a second and using conventional plastics forming equipment, which is impossible using the Degen et al. method.

One simple method for determining the structure of a composite produced by the CWM process is to apply a stress by cutting, pulling, or repeatedly compressing and decompressing a sample. The result is the conversion of the continuous binder phase into visible fibers. Such fibers are not spontaneously formed in point-bonded structures that undergo such stresses. They also do not form when the binder resin is of a type that resists the formation of fibers.

L. Non-Fiberizing Binders

Example 41

The CWM and FPB processes can be applied to polymers that have been shown to resist conversion when incorporated into a CWM composite. For example, an acrylic resin supplied by Mitsubishi Chemical of Japan (Microspheres M and M-100) was shown to form the usual continuous polymeric structure characteristic of the CWM process but to resist conversion to fibers when exposed to an applied stress. It appears likely that this material cannot be converted to fibers because of its amorphous structure as opposed to crystalline polymers, all of which that have been tested are converted to fibers by applied stress. However, testing of formulations consisting of 5% by weight Microspheres M mixed with powdered stainless steel (304 stainless steel alloy, 100 to 325 mesh, Hoganeas Corporation) demonstrated that a strong and brittle, nonfiberized, CWM structure could be produced when pressures and temperatures within the usual CWM range were used, i.e. 6000 psi (426.86 kg/cm$^2$) and 350°–400° C., with the usual sequence of heating followed by the application of intense pressure and shear.

Similar results have been observed when using 5% by weight Nylon 6/6 6/12 Caprolactam H005 080N supplied by Atochem Corporation mixed with 100 to 325 mesh powdered 304 alloy stainless steel. Although this particular composite could not be converted to fibers by an applied stress, a normal continuous polymeric web was formed under temperatures ranging from 200° to 400° C. and at pressures up to 8000 psi (562.48 kg/cm$^2$). The resulting resin-stainless steel mixture could be forced to produce a strong CWM structure at standard temperatures and pressures required for CWM processing, i.e. 300° C. and 6000 psi (421.86 kg/cm$^2$) being typical, and CWM-type structures could not be achieved at temperatures or pressures outside those specified for the CWM process.

M. Roll Compacting Non-Functionalized Adsorbent Resins

Example 42

Samples of XAD-16 nonfunctionalized adsorbent resin (Rohm & Haas, Philadelphia, Pa.) were mixed with FE-532 resin but such mixtures were not stable. Addition of powdered stainless steel did not materially alter this instability, resulting in the separation of the powders when mixed. XAD-16 resin was treated with a dilute solution of a nonionic surfactant and allowed to air dry. When again mixed with FE-532 resin and stainless steel, stable mixtures were obtainable and the material could be processed by both compression molding and roll compaction into pellets and sheet.

It appears that the smooth hydrophobic character of the XAD-16 resin prevents the formation of a stable mixture with the FE-532 binder prticles. To overcome this problem, treatment is required to obtain a more hydrophilic surface character.

N. Extruded Structures

Example 43

A mixture consisting of 9% of FN-510 polyethylene binder resin (Quantum Chemicals) and 91% 80×325 mesh TOG-grade activated carbon powder (Calgon Carbon Corporation) was produced by ball milling as described in Example 17. The mixture was fed into a 2.5 in. (6.35 cm) O.D. 10:1 ratio extruder fitted with an auger-type screw operating in a two-zone heated barrel. The feed section of the extruder was not cooled. Zone 1 of the barrel was maintained at 125° F. and zone 2 at 170° F. Attached to the extruder was a 2.4 in. (6.1 cm) circular O.D die having a heated zone and a water-cooled jacket zone The 10 in. (25 cm) long heated zone was maintained at 170°–210° C. while the 4 in. (10 cm) long water jacketed zone was maintained at 50°–60° C. Powder was fed at 5 RPM into the die by the screw, which was terminated by a 0.75 in. (1.9 cm) screw extension. Under these conditions, a fully consolidated extruded tube of immobilized carbon powder was produced in a continuous manner.

Example 44

Using the method of Example 43, a mixture of 80% anionic and cationic ion-exchange resins (Grave Chemical Company), 15% by weight FE-532 and 5% acrylic fibers was made. This mixture was processed using the extrusion method outlined in Example 43 with a barrel zone 1 temperature of 120° F. and zone 2 of 160° F., and die heated zone temperature of 150° C. and cooling zone temperature of 50° C. A continuous, porous, powdered ion-exchange resin composite tube was continuously produced by this method.

Example 45

Using intense mixing, a mixture of 85% acrylic fiber and 15% FN-510 binder was made. This mixture was processed using the extruder described in Example 43 with barrel zone 1 maintained at 120° F., zone 2 at 160° F., die heated zone maintained at 150° C., and die cooling zone at 50° C. A continuous, porous, structure was produced under these conditions.

The composite products produced by forced point-bonding or nonfiberizing CWM structures according to the present invention are quite distinct from the point bonded product of the aforementioned Degen et al. Patent. The composite materials produced according to this invention are of higher density that those produced with the low temperatures and low levels of compression described in the Degen et al. patent. Moreover, the forced point-bonded composite products of this invention are formed with a melted and resolidified binder matrix. In Degen et al. the binder particles only soften and never melt and resolidify thereby producing a much different lower density and weaker composite structure featuring point-bonds of binder particles.

The structures formed by this invention have a unique appearance under microscopic observation and they have unusual physical characteristics that are substantially different from structures lacking a continuous binder polymer structural phase. The CWM structures respond in a unique manner to stress to form a dense mass of fibers within the composite at room temperature, when the binder is of a crystalline character. FPB materials are substantially stronger than materials bonded under low pressure and shear conditions and at lower temperatures. It has been found to be crucial that the matrix of particles be fully preheated prior to the application of shear and pressure.

The FE532 alkylene-vinyl copolymer employed in the foregoing examples is a plastic powder, 90% ethylene, 10% vinylacetate copolymer available from Quantum Chemical Co. Such a polymer generally has a density of about 0.928 gm/cm², and a melt index of about 9 gm/10 min., average particle size less than 20 micrometers, and Vicat softening point of 75° C.

In some of the foregoing examples the products produced were not of optimum quality or properties. However, it is to be recognized that such products were still useful for the indicated purposes. For other intended uses such products may be considered as being of high quality and to possess all the required properties.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A porous composite article comprising:
a plurality of primary particles having relatively high softening temperatures, said particles having a diameter between about 0.1 and about 3000 micrometers; and
a matrix of from 3 to 30% by weight of a substantially continuous thermoplastic binder phase supporting and emeshing said primary particles, said continuous binder phase being formed from binder particles having a diameter of between about 0.1 to about 150 micrometers, said binder particles being substantially incapable of fibrillation under normal conditions into micro fibers of less than 10 micrometers diameter at room temperature and having a softening temperature substantially below the softening temperature of the primary particles,
and where such primary particles are consolidated into a uniform matrix with the continuous binder material present as a dilute material within the pores between the primary particles, the remainder of the pore volume comprising a continuous volume of voids and said binder material being forced into macropores and exterior voids of individual primary particles having such macropores and exterior voids.

2. The composition of claim 1 wherein said binder material is present in an amount between about 4% to about 8% by weight of the composition.

3. The composition of claim 1 wherein said primary particles are metal.

4. The composition of claim 3 wherein said metal is ferromagnetic.

5. The composition of claim 4 wherein said metal is a steel.

6. The composition of claim 5 wherein said metal is a stainless steel.

7. The composition of claim 3 wherein said binder material is present in an amount between about 4% to about 8% by weight of the composition.

8. The composition of claim 1 wherein said primary particles comprise a silica gel.

9. The composition of claim 1 wherein said primary particles are sawdust.

10. The composition of claim 1 wherein said primary particles are sand.

11. The composition of claim 1 wherein said primary particles comprise an ion-exchange resin.

12. The composition of claim 11 wherein said primary particles comprise a ferromagnetic metal.

13. The composition of claim 12 wherein said metal is a stainless steel.

14. The composition of claim 11 wherein said primary particles comprise organic fibers.

15. The composition of claim 14 wherein said organic fibers are cellulose.

16. The composition of claim 14 wherein said organic fibers are acrylic.

17. The composition of claim 1 wherein said primary particles comprise a diatomaceous earth.

18. The composition of claim 17 wherein said primary particles comprise organic fibers.

19. The composition of claim 8 wherein said organic fibers are cellulose.

20. The composition of claim 19 wherein said organic fibers are acrylic.

21. The composition of claim 1 wherein said primary particles comprise abrasives.

22. The composition of claim 21 wherein said primary particles comprise a glass.

23. The composition of claim 21 wherein said primary particles comprise an abrasive selected from the group consisting of silicon carbide or alumina.

24. The composition of claim 21 wherein said primary particles comprise a silica.

25. The composition of claim 1 wherein said primary particles comprise an ion complexing material.

26. The composition of claim 25 wherein said primary particles comprise organic fibers.

27. The composition of claim 26 wherein said fibers are cellulose.

28. The composition of claim 26 wherein said fibers are acrylic.

29. The composition of claim 25 wherein said primary particles comprise a ferromagnetic metal.

30. The composition of claim 29 wherein said metal comprises a stainless steel.

31. The composition of claim 1 wherein said primary particles comprise carbon.

32. The composition of claim 31 wherein said primary particles comprise an activated carbon.

33. The composition of claim 1 wherein the binder material forming the matrix is a crystalline thermoplastic polymer selected from the group consisting of polyolefins, polyvinyls, polyvinyl esters, polyvinyl ethers, polyvinyl sulfates, polyvinyl phosphates, polyvinyl amines, polyoxidiazoles, polytriazols, polycarbodiimides, ethylene-vinyl acetate copolymers, polysulfones, polycarbonates, polyethers, polyarylene oxides, and polyesters.

34. The composition of claim 33 wherein the binder material is polyethylene.

35. The composition of claim 33 wherein the binder material is polypropylene.

36. The composition of claim 33 wherein the binder material is polybutene-1.

37. The composition of claim 33 wherein the binder material is poly-4-methylpentene-1.

38. The composition of claim 33 wherein the binder material is polyvinyl chloride.

39. The composition of claim 33 wherein the binder material is polyvinyl fluoride.

40. The composition of claim 33 wherein the binder material is polyvinylidene chloride.

41. The composition of claim 33 wherein the binder material is polyvinyl acetate.

42. The composition of claim 33 wherein the binder material is polyvinyl proprionate.

43. The composition of claim 33 wherein the binder material is polyvinyl pyrrolidone.

44. The Composition of claim 33 wherein the binder material is a polysulfone.

45. The composition of claim 33 wherein the binder is a polycarbonate.

46. The composition of claim 33 wherein the binder material is polyethylene oxide.

47. The composition of claim 33 wherein the binder material is polymethylene oxide.

48. The composition of claim 33 wherein the binder material is polypropylene oxide.

49. The composition of claim 33 wherein the binder material is a polyarylate.

50. The composition of claim 33 wherein the binder material is polyethylene terephthalate.

51. The composition of claim 33 wherein the binder material is a polyimide.

52. The composition of claim 44 wherein the binder material is an ethylene polymer selected from the group consisting of polyethylene or an ethylene-vinyl acetate copolymer.

53. The composition of claim 3 wherein the binder material is an ethylene polymer selected from the group consisting of polyethylene or an ethylene-vinyl acetate copolymer.

54. The composition of claim 6 wherein the binder material is an ethylene polymer selected from the group consisting of polyethylene or an ethylene-vinyl acetate copolymer.

55. The composition of claim 8 wherein the binder material is an ethylene polymer selected from the group consisting of polyethylene or an ethylene-vinyl acetate copolymer.

56. The composition of claim 9 wherein the binder material is an ethylene polymer selected from the group consisting of polyethylene or an ethylene-vinyl acetate copolymer.

57. The composition of claim 10 wherein the binder material is an ethylene polymer selected from the group consisting of polyethylene or an ethylene-vinyl acetate copolymer.

58. The composition of claim 11 wherein the binder material is an ethylene polymer selected from the group consisting of polyethylene or an ethylene-vinyl acetate copolymer.

59. The composition of claim 13 wherein the binder material is an ethylene polymer selected from the group consisting of polyethylene or an ethylene-vinyl acetate copolymer.

60. The composition of claim 15 wherein the binder material is an ethylene polymer selected from the group consisting of polyethylene or an ethylene-vinyl acetate copolymer.

61. The composition of claim 16 wherein the binder material is an ethylene polymer selected from the group consisting of polyethylene or an ethylene-vinyl acetate copolymer.

62. The composition of claim 17 wherein the binder material is an ethylene polymer selected from the group consisting of polyethylene or an ethylene-vinyl acetate copolymer.

63. The composition of claim 19 wherein the binder material is an ethylene polymer selected from the group consisting of polyethylene or an ethylene-vinyl acetate copolymer.

64. The composition of claim 20 wherein the binder material is an ethylene polymer selected from the group consisting of polyethylene or an ethylene-vinyl acetate copolymer.

65. The composition of claim 21 wherein the binder material is an ethylene polymer selected from the group consisting of polyethylene or an ethylene-vinyl acetate copolymer.

66. The composition of claim 22 wherein the binder material is an ethylene polymer selected from the group consisting of polyethylene or an ethylene-vinyl acetate copolymer.

67. The composition of claim 23 wherein the binder material is an ethylene polymer selected from the group consisting of polyethylene or an ethylene-vinyl acetate copolymer.

68. The composition of claim 24 wherein the binder material is an ethylene polymer selected from the group consisting of polyethylene or an ethylene-vinyl acetate copolymer.

69. The composition of claim 25 wherein the binder material is an ethylene polymer selected from the group consisting of polyethylene or an ethylene-vinyl acetate copolymer.

70. The composition of claim 27 wherein the binder material is an ethylene polymer selected from the group consisting of polyethylene or an ethylene-vinyl acetate copolymer.

71. The composition of claim 28 wherein the binder material is an ethylene polymer selected from the group consisting of polyethylene or an ethylene-vinyl acetate copolymer.

72. The composition of claim 30 wherein the binder material is an ethylene polymer selected from the group consisting of polyethylene or an ethylene-vinyl acetate copolymer.

73. The composition of claim 31 wherein the binder material is an ethylene polymer selected from the group consisting of polyethylene or an ethylene-vinyl acetate copolymer.

74. The composition of claim 32 wherein the binder material is an ethylene polymer selected from the group consisting of polyethylene or an ethylene-vinyl acetate copolymer.

75. The composition of claim 8 wherein the binder material is polyethylene.

76. The composition of claim 8 wherein the binder material is polyethylene oxide.

77. A porous composite article comprising:
   a plurality of primary particles having relatively high softening temperatures, said particles having a diameter between 0.1 and 3000 micrometers; and
   a matrix of from 3 to 30% by weight of a thermoplastic binder material having a softening temperature substantially below the softening temperature of the primary particles, said matrix being formed from binder particles having a diameter of from about 0.1 to about 150 micrometers;
   wherein the primary particles are consolidated into a uniform matrix with melted and resolidified binder matrix present as forced point-bonds between the primary particles, wherein binder material is forced into macropores and exterior voids of individual primary particles to form physical connections between particles having such macropores and exterior voids.

78. The composition of claim 77 wherein the binder material is a resin that is resistant to conversion.

79. The composition of claim 77 wherein the binder material is a resin selected from the group consisting of acrylic and nylon resins.

80. A composite composition of claim 77 wherein the binder material is a noncrystalline or amorphous polymer.

81. The composition of claim 77 wherein the primary particles are granular or powdered carbon.

82. The material of claim 81 wherein the binder material is an ethylene polymer selected from the group consisting of polyethylene or an ethylene-vinyl acetate copolymer.

83. The material of claim 77 wherein the primary particles are stainless steel.

84. The material of claim 79 wherein the primary particles are stainless steel.

85. The material of claim 80 wherein the primary particles are stainless steel.

86. The composition of claim 1 wherein the binder material is an amorphous or non-crystalline polymer selected from the group consisting of polystyrenes, acrylonitrile-styrene copolymers, and styrene-butadiene copolymers.

87. A porous composite material comprising:
a plurality of primary particles; and
a webbing matrix of polytetrafluoroethylene supporting and enmeshing said primary particles and where such primary particles are consolidated into a uniform matrix with polytetrafluoroethylene webbing present within the pores remaining between the primary particles;
said composite material produced according to a process comprising:
providing a quantity of first particles of a polytetrafluorethylene binder material, said first particles having diameters between about 0.1 and 150 micrometers;
providing from 3 to 30% by weight of second particles of a primary material having a softening temperature substantially greater than the softening temperature of said polytetrafluorethyleen binder material, said second particles having diameters between about 0.1 and about 3000 micrometers;
combining the first and second quantities of particles in a substantially uniform mixture;
heating said substantially uniform mixture, in the absence of pressure or shear sufficient to convert the polytetrafluoroethylene binder particles into a continuous phase through the composite material, to a temperature substantially above the softening temperature of said binder material but to a temperature less than the softening temperature of said primary material;
thereafter applying pressure and shear to the heated mixture sufficient substantially immediately to convert at least a portion of the polytetrafluoroethylene binder material particles into a substantially continuous webbing structure through the composite material; and
substantially immediately after formation of said continuous binder structure, rapidly cooling said mixture to below the softening point of the polytetrafluoroethylene binder material to retain said converted binder material in its continuous webbing structure condition to produce the composite material.

* * * * *